US012456448B2

(12) United States Patent
Oosugi et al.

(10) Patent No.: US 12,456,448 B2
(45) Date of Patent: Oct. 28, 2025

(54) SIGNAL PROCESSING DEVICE, MICROPHONE DEVICE, SIGNAL PROCESSING METHOD, AND RECORDING MEDIUM

(71) Applicants: NEC CORPORATION, Tokyo (JP); TOYOTA JIDOSHA KABUSHIKI KAISHA, Toyota (JP)

(72) Inventors: Kouji Oosugi, Tokyo (JP); Hiroki Okada, Toyota (JP)

(73) Assignees: NEC CORPORATION, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 364 days.

(21) Appl. No.: 18/034,492

(22) PCT Filed: Nov. 4, 2021

(86) PCT No.: PCT/JP2021/040647

§ 371 (c)(1),
(2) Date: Apr. 28, 2023

(87) PCT Pub. No.: WO2022/097693

PCT Pub. Date: May 12, 2022

(65) Prior Publication Data

US 2024/0347033 A1 Oct. 17, 2024

(30) Foreign Application Priority Data

Nov. 9, 2020 (JP) ................................ 2020-186725

(51) Int. Cl.
*G10K 11/178* (2006.01)

(52) U.S. Cl.
CPC .. *G10K 11/17853* (2018.01); *G10K 11/17825* (2018.01)

(58) Field of Classification Search
CPC ....... G10K 11/17815; G10K 11/17817; G10K 11/17879; H04R 1/1016; H04R 25/305
See application file for complete search history.

(56) References Cited

U.S. PATENT DOCUMENTS

2007/0009122 A1 1/2007 Hamacher
2013/0083940 A1 4/2013 Hwang
(Continued)

FOREIGN PATENT DOCUMENTS

EP 3 846 052 A1 7/2021
GB 2 071 375 A 9/1981
(Continued)

OTHER PUBLICATIONS

Extended European Search Report dated Apr. 18, 2024 in Application No. 21889245.3.
(Continued)

*Primary Examiner* — Kile O Blair
(74) *Attorney, Agent, or Firm* — Sughrue Mion, PLLC

(57) ABSTRACT

A signal processing device determines whether a relationship between a first signal and a second signal satisfies a first condition, the first signal being based on an output of a first microphone inserted into an ear canal of a user, the second signal being based on an output of a second microphone positioned outside the ear canal. The signal processing device starts processing relating to transmission of a sound signal when it is determined that the first condition is satisfied, and that continues the processing, even after the first condition is not satisfied, during a period in which a second condition that differs from the first condition is satisfied.

17 Claims, 23 Drawing Sheets

(56) References Cited

U.S. PATENT DOCUMENTS

| | | | |
|---|---|---|---|
| 2019/0387330 | A1 | 12/2019 | Rueckerl et al. |
| 2020/0196054 | A1 | 6/2020 | Usher et al. |

FOREIGN PATENT DOCUMENTS

| | | | |
|---|---|---|---|
| JP | 11-46397 | A | 2/1999 |
| JP | 2007-028610 | A | 2/2007 |
| JP | 2009-212715 | A | 9/2009 |
| KR | 10-2011-0107831 | A | 10/2011 |
| WO | 2020/045204 | A1 | 3/2020 |

OTHER PUBLICATIONS

Korean Office Action dated Sep. 30, 2024 in Application No. 10-2023-7014622.

Notice of Reasons for Refusal of Japanese Application No. 2020-186725 dated Nov. 8, 2022.

International Search Report of PCT/JP2021/040647 dated Feb. 8, 2022 [PCT/ISA/210].

SIGNAL PROCESSING DEVICE, MICROPHONE DEVICE, SIGNAL PROCESSING METHOD, AND RECORDING MEDIUM

CROSS REFERENCE TO RELATED APPLICATIONS

This application is a National Stage of International Application No. PCT/JP2021/040647, filed Nov. 4, 2021, claiming priority to Japanese Patent Application No. 2020-186725, filed Nov. 9, 2020.

TECHNICAL FIELD

This disclosure relates to a signal processing device, a microphone device, a signal processing method, and a recording medium.

BACKGROUND ART

Patent Document 1 discloses a technique of passing sound picked up by a microphone through a band-pass filter to extract the bone vibration sound of the person wearing a hearing aid.

PRIOR ART DOCUMENTS

Patent Documents

Patent Document 1: Japanese Unexamined Patent Application, First Publication No. 2009-212715

SUMMARY OF THE INVENTION

Problems to be Solved by the Invention

Patent Document 1 discloses a technique for extracting a user's voice based on the difference in feature quantities between sound due to vibration conduction through air and sound due to vibration conduction through bone. However, the above technique may not be highly versatile.

An object of this disclosure is to provide a signal processing device, a microphone device, a signal processing method, and a recording medium that solve the above problem.

Means for Solving the Problem

A signal processing device according to an aspect of the present disclosure includes: a determination means that determines whether a relationship between a first signal and a second signal satisfies a first condition, the first signal being based on an output of a first microphone inserted into an ear canal of a user, the second signal being based on an output of a second microphone positioned outside the ear canal; and a signal transmission means that starts processing relating to transmission of a sound signal when it is determined that the first condition is satisfied, and that continues the processing, even after the first condition is not satisfied, during a period in which a second condition that differs from the first condition is satisfied.

A microphone device according to an aspect of the present disclosure includes: a case that includes a first portion inserted into an ear canal of a user and a second portion located outside the ear canal and that is to be worn on an ear of the user and; a first microphone provided in the first portion of the case: a second microphone provided in the second portion of the case; and a control means that starts processing relating to transmission of a sound signal when a relationship between a first signal output from the first microphone and a second signal output from the second microphone satisfies a first condition, and continues the processing, even after the first condition is not satisfied, during a period in which a second condition that differs from the first condition is satisfied.

A signal processing method according to an aspect of the present disclosure includes: determining whether a relationship between a first signal and a second signal satisfies a first condition, the first signal being based on an output of a first microphone inserted into an ear canal of a user, the second signal being based on an output of a second microphone positioned outside the ear canal; and starting processing relating to transmission of a sound signal when it is determined that the first condition is satisfied, and continuing the processing, even after the first condition is not satisfied, during a period in which a second condition that differs from the first condition is satisfied.

A recording medium according to an aspect of the present disclosure stores a program causing a computer to execute: determining whether a relationship between a first signal and a second signal satisfies a first condition, the first signal being based on an output of a first microphone inserted into an ear canal of a user, the second signal being based on an output of a second microphone positioned outside the ear canal; and starting processing relating to transmission of a sound signal when it is determined that the first condition is satisfied, and continuing the processing, even after the first condition is not satisfied, during a period in which a second condition that differs from the first condition is satisfied.

Effect of Invention

According to at least one of the above aspects, it is possible to increase the versatility related to extracting the user's voice.

EMBODIMENTS FOR CARRYING OUT THE INVENTION

First Embodiment (Usage Example of Microphone Device)

A usage example of a microphone device 1 according to the first embodiment will be described below.

Figure 1:
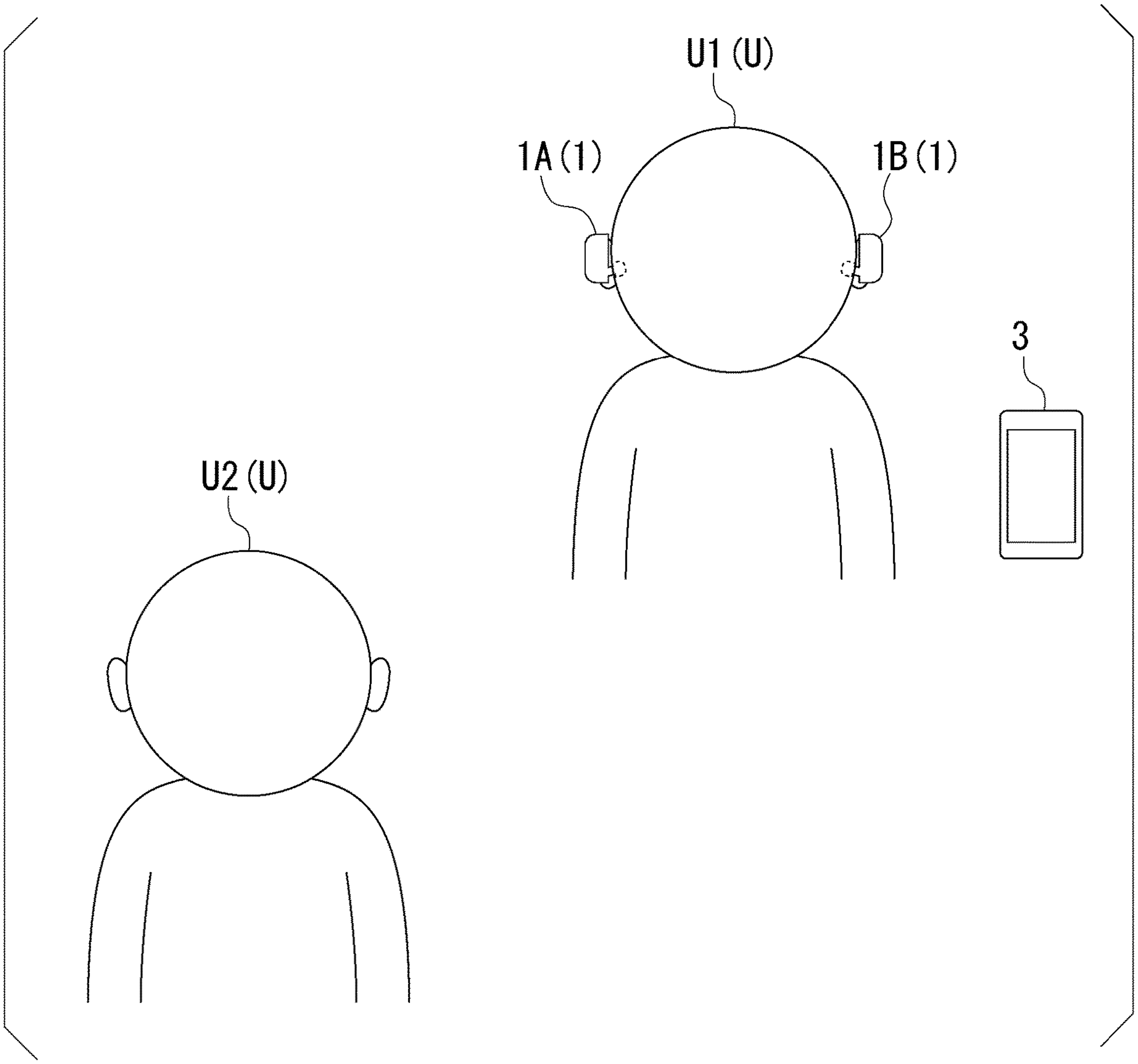
FIG. 1 A diagram showing a usage example of a microphone device according to the first embodiment.

FIG. 1 is a diagram showing a usage example of the microphone device 1 according to the first embodiment. The microphone device 1 converts a picked-up sound into an electrical signal and transmits the electrical signal to the outside. An example of the sound picked up by the microphone device 1 is the voice produced by a user U (the naturally occurring sound of the user U). In addition to the functions described above, the microphone device 1 may convert an electrical signal received from the outside into sound and transmit the converted sound.

In the usage example shown in FIG. 1, the user U wearing the microphone device 1 is referred to as user U1. In addition, in the usage example shown in FIG. 1, the user U who does not wear the microphone device 1 is referred to as a user U2. Note that hereinbelow, when the user U1 and the user U2 are not distinguished from each other, they are collectively referred to as "user U".

The microphone device 1 is worn on the body of the user U1. As shown in FIG. 1, the microphone device 1A is worn on the right ear of the user U1. Also, the microphone device 1B is worn on the left ear of the user U1. The microphone device 1A and the microphone device 1B have the same configuration. Hereinbelow, the microphone device 1A and the microphone device 1B will be referred to as the "microphone device 1" when not distinguished from each other. Note that the form of the microphone device 1 shown in FIG. 1 is merely an example. Also, the manner of wearing the microphone device 1 shown in FIG. 1 is an example.

The microphone device 1 is connected to a mobile terminal or the like by wire or wirelessly. Examples of a mobile terminal include a smartphone 3, a tablet terminal, a voice recorder, and the like. In the usage example shown in FIG. 1, the microphone device 1 converts a picked-up sound into an electrical signal and transmits the electrical signal to the smartphone 3.

The smartphone 3 records the electrical signal received from the microphone device 1 in a storage unit (not shown) included in the smartphone 3. Thereby the user U1 is able to record the voice on the smartphone 3.

(Configuration of Microphone Device)

A detailed configuration of the microphone device 1 will be described below.

Figure 2:
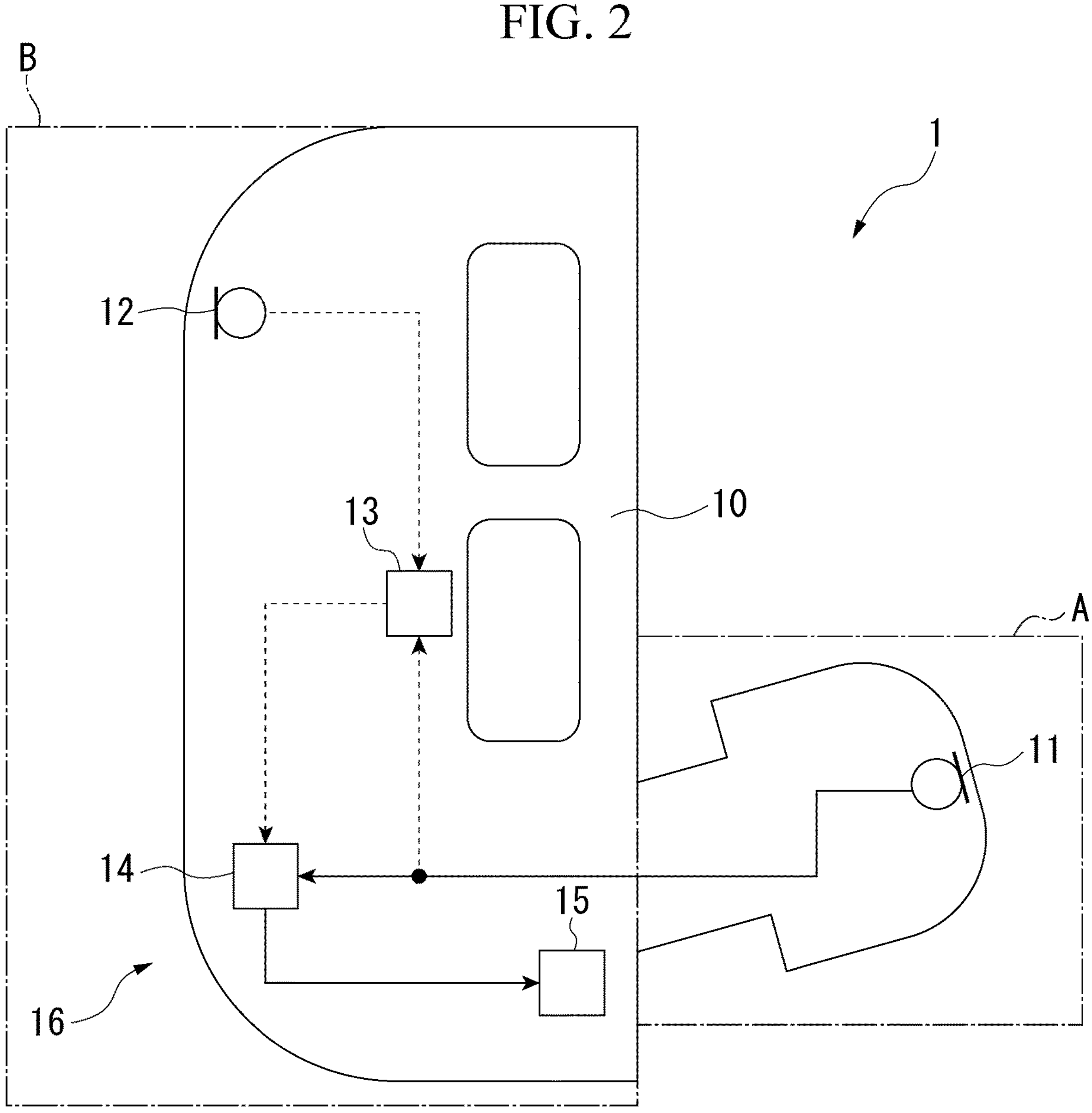
FIG. 2 A diagram showing the configuration of the microphone device according to the first embodiment.

FIG. 2 is a diagram showing a detailed configuration of the microphone device 1. The microphone device 1 includes a case 10, a first microphone 11, a second microphone 12, a determination unit 13, a detection unit 14, and a signal transmission unit 15. The determination unit 13, the detection unit 14, and the signal transmission unit 15 are collectively referred to as a control unit 16. The control unit 16 is an example of a control means. The control unit 16 is also an example of a signal processing device.

Note that the solid arrows in FIG. 2 indicate the flow of electrical signals pertaining to the signal transmission unit 15. The dotted arrows in FIG. 2 indicate the flow of electrical signals pertaining to the determination unit 13.

The case 10 is a housing for the microphone device 1. The case 10 is worn on the ear of the user U1. The case 10 has a first portion A that is inserted into the ear canal of the user U1 and a second portion B that is positioned outside the ear canal of the user U1. Examples of materials that form the case 10 include synthetic resin, metal, wood, and ceramics. Materials for forming the case 10 are selected based on the type of sound picked up or transmitted by the microphone device 1. Note that the form of the case 10 is not limited to that shown in FIG. 2.

The first microphone 11 is a device that picks up sound via the transmission of vibrations through the air. The first microphone 11 is provided in the first portion A of the case 10. The position where the first microphone 11 is provided in the first portion A is not limited to the example shown in FIG. 2. The first microphone 11 converts the conducted vibrations of air into mechanical vibrations. The first microphone 11 converts the converted mechanical vibration into an electrical signal. Thereby, the first microphone 11 converts the sound conducted by the air into an electrical signal. In the usage example of FIG. 1, there are the following two types of electrical signals generated by the first microphone 11.

Assume that user U1 has made an utterance. In this case, the skull and muscles of the user U1 vibrate, and that vibration is transmitted to the ear cartilage of the user U1. The vibration of the cartilage of the ear of the user U1 causes the air inside the ear canal of the user U1 to vibrate. Therefore, the first microphone 11 can pick up vocal utterances of the user U1. At this time, the electrical signal generated by the first microphone 11 based on the sound picked up by the first microphone 11 shall be denoted as IS1.

On the other hand, when the user U1 utters a sound, the air around the user U1 vibrates. This air vibration allows the first microphone 11 to pick up the voice uttered by the user U1. Let IS2 be an electrical signal generated by the first microphone 11 based on the sound picked up by the first microphone 11 at this time. IS1 occurs before IS2 due to differences such as the length of the conduction route that conducts the vibration.

The first microphone 11 transmits generated electrical signals to the determination unit 13 and the detection unit 14. An electrical signal output from the first microphone 11 shall be called a first signal. That is, IS1 and IS2 are first signals.

The second microphone 12 is a device that picks up sound through the conduction of vibrations through the air. The second microphone 12 is provided in the second portion B of the case 10. The position where the second microphone 12 is provided in the second portion B is not limited to the example shown in FIG. 2. The second microphone 12 converts the conducted vibrations of the air into mechanical vibrations. The second microphone 12 converts the converted mechanical vibration into an electrical signal. Thereby, the second microphone 12 converts the sound conducted by the air into an electrical signal. In the usage example of FIG. 1, there are the following two types of electrical signals generated by the second microphone 12.

Assume that user U1 has made an utterance. In this case, the skull and muscles of the user U1 vibrate, and that vibration is transmitted to the ear cartilage of the user U1. The vibration of the cartilage of the ear of the user U1 causes the air inside the ear canal of the user U1 to vibrate. After that, the vibration of the air inside the ear canal causes the air outside the ear canal to vibrate. Thereby, the second microphone 12 can pick up the utterances of the user U1. At this time, the electrical signal generated by the second microphone 12 based on the sound picked up by the second microphone 12 shall be denoted as OS1.

On the other hand, when the user U1 utters a sound, the air around the user U1 vibrates. This air vibration allows the second microphone 12 to pick up the vocal utterances made by the user U1. At this time, the electrical signal generated by the second microphone 12 based on the sound picked up by the second microphone 12 shall be denoted as OS2. OS1 occurs earlier than OS2 due to differences such as the length of the conduction route that conducts the vibration.

The second microphone 12 transmits the generated electrical signals to the determination unit 13. An electrical signal output from the second microphone 12 shall be called a second signal. That is, OS1 and OS2 are second signals.

IS1 is the electrical signal that occurs earliest among IS1, IS2, OS1, and OS2 after user U1 utters a sound. This is because IS1 is the electrical signal produced by the shortest conduction route.

Sound conducted by air vibrations has a higher sound pressure level than sound conducted by vibrations in the skull and muscles. Therefore, the sound pressure level indicated by IS2 or OS2 is higher than the sound pressure level indicated by IS1 or OS1. Also, the distance between the position of the second microphone 12 where OS2 is generated and the mouth of the user U1 who emits the sound is shorter than the distance between the position of the first microphone 11 where the IS2 is generated and the mouth of the user U1 who emits the sound. Therefore, the sound pressure level indicated by OS2 is higher than the sound pressure level indicated by IS2. For the above reason, among IS1, IS2, OS1, and OS2, OS2 has the highest sound pressure level indicated by the electrical signal.

(Configuration of Control Unit)

The configuration of the control unit will be described below.

The determination unit 13 determines whether the relationship between the first signal and the second signal satisfies a first condition. The first condition is that the sound pressure level indicated by the first signal is higher than the sound pressure level indicated by the second signal. The determination unit 13 is an example of a determination means. The operation of the determination unit 13 after the user U1 has made a vocal utterance will be described below.

When the user U1 makes a vocal utterance, the first microphone 11 outputs IS1. After that, the second microphone 12 outputs OS1. The sound conduction route associated with IS1 is shorter than the sound conduction route associated with OS1. Therefore, the sound pressure level indicated by the first signal is higher than the sound pressure level indicated by the second signal. Accordingly, the determination unit 13 determines that the relationship between the first signal and the second signal satisfies the first condition.

Subsequently, the second microphone 12 outputs OS2. At this time, the first signal received by the determination unit 13 is IS1. The second signals received by the determination unit 13 are OS1 and OS2. Therefore, the sound pressure level indicated by the first signal is not greater than the sound pressure level indicated by the second signal (at least the sound pressure level indicated by IS1 (first signal) is not greater than that indicated by OS2 (second signal), which has the higher sound pressure level of OS1 and OS2). Therefore, the determination unit 13 determines that the relationship between the first signal and the second signal does not satisfy the first condition.

After that, the first microphone 11 outputs IS2. At this time, the first signals received by the determination unit 13 are IS1 and IS2. The second signals received by the determination unit 13 are OS1 and OS2. Therefore, the sound pressure level indicated by the first signals is not higher than the sound pressure level indicated by the second signals (at least the sound pressure level indicated by IS2 (first signal), which has the higher sound pressure level of IS1 and IS2, is not greater than the sound pressure level indicated by OS2 (second signal), which has the higher sound pressure level of OS1 and OS2). For that reason, the determination unit 13 determines that the relationship between the first signal and the second signal does not satisfy the first condition.

That is, when the user U1 makes a vocal utterance, the determination unit 13 performs the following operations. Based on IS1 and OS1 that occur first, the determination unit 13 determines that the relationship between the first signal and the second signal satisfies the first condition. Subsequently, the determination unit 13 also receives OS2. Accordingly, the determination unit 13 determines that the relationship between the first signal and the second signal does not satisfy the first condition. The first condition is that the first signal is greater than the second signal.

The detection unit 14 determines whether or not the sound pressure level indicated by the first signal (at least one of IS1 and IS2) is equal to or greater than the first threshold. The detection unit 14 is an example of a detection means. The first threshold is a preset value and is a threshold for detecting whether or not there is sound. For example, when the user U1 does not speak, the detection unit 14 determines that the sound pressure level indicated by the first signal is equal to or lower than the first threshold.

Note that the detection unit 14 may determine whether or not the sound pressure level of a signal related to the voice uttered by a person among the first signals is equal to or greater than a predetermined threshold.

When it is determined that the first condition is satisfied, the signal transmission unit 15 starts processing related to transmission of the first signal, and continues the processing even after the first condition is no longer satisfied (alternatively, regardless of whether or not the first condition is met), during a period in which a second condition is satisfied. The signal transmission unit 15 is an example of a signal transmission means. The second condition above is that the sound pressure level indicated by the first signal (at least one of IS1 and IS2) is determined by the detection unit 14 to be equal to or greater than the first threshold. For example, when the user U1 makes a vocal utterance, the detection unit 14 determines that the sound pressure level indicated by the first signal is equal to or greater than the first threshold. That is, the second condition is satisfied when the user U1 is speaking.

In the case of the usage example shown in FIG. 1, the signal transmission unit 15 transmits the first signal to the smartphone 3.

(Operation of Microphone Device)

The operation of the microphone device 1 according to the first embodiment will be described below.

Figure 3:
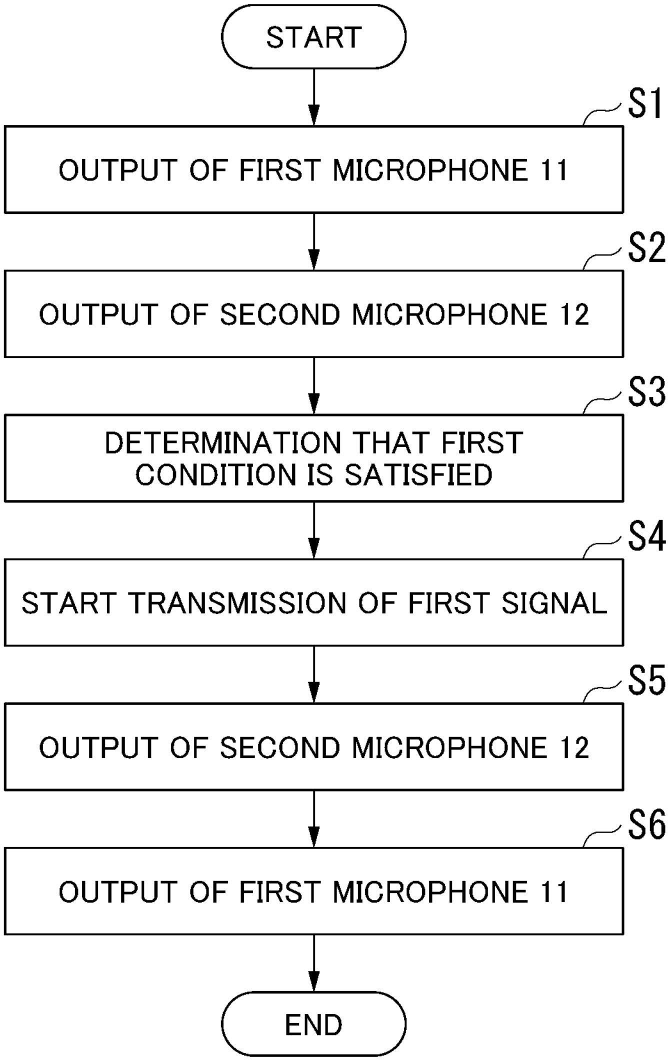
FIG. 3 A flowchart showing the operation of the microphone device according to the first embodiment.

FIG. 3 is a flowchart showing the operation of the microphone device 1 when the user U1 makes a vocal utterance.

The user U1 makes a vocal utterance. The air inside the ear canal of the user U1 vibrates due to the vibration of the skull and muscles of the user U1. Thereby, the first microphone 11 outputs IS1 to the determination unit 13 and the detection unit 14 (Step S1).

Subsequently, the air outside the ear canal of the user U1 vibrates. Thereby, the second microphone 12 outputs OS1 to the determination unit 13 (Step S2).

The determination unit 13 determines that the relationship between the first signal and the second signal satisfies the first condition (Step S3). Since the sound pressure level indicated by IS1 is higher than the sound pressure level indicated by OS1, the determination unit 13 determines that the first condition is satisfied.

Since it is determined in Step S3 that the first condition is satisfied, the signal transmission unit 15 starts transmitting the first signal to the smartphone 3 (Step S4).

As the sound uttered by the user U1 is conducted by air vibrations, the second microphone 12 outputs OS2 to the determination unit 13 (Step S5).

Due to the voice uttered by the user U1 being conducted by air vibrations, the first microphone 11 outputs IS2 to the determination unit 13 and the detection unit 14 (Step S6).

By the above operation, the microphone device 1 can transmit the voice of the user U1 to the smartphone 3.

The transmission started in Step S4 is continued while the second condition is satisfied. On the other hand, if the user U1 stops making utterances, the second condition is no longer satisfied. In this case, the transmission started in Step S4 is stopped.

In the usage example shown in FIG. 1, when the user U2 makes a vocal utterance, the microphone device 1 operates as follows.

Unlike user U1's vocalizations, user U2's vocalizations do not produce electrical signals such as IS1 and OS1, which are conducted through vibrations of the skull and muscles.

An utterance of the user U2 is transmitted to the user U1 by air. The second microphone 12 first picks up the voice of the user U2 and outputs the second signal. Subsequently, the first microphone 11 picks up the voice of the user U2 and outputs the first signal. In this case, the conduction route for the second signal is shorter than the conduction route for the first signal. Therefore, the sound pressure level indicated by the second signal is higher than the sound pressure level indicated by the first signal. Accordingly, even if the user U2 makes a vocal utterance, the determination unit 13 determines that the relationship between the first signal and the second signal does not satisfy the first condition. Based on the determination made by the determination unit 13, the signal transmission unit 15 does not transmit the voice of the user U2 to the smartphone 3.

Thus, the microphone device 1 picks up and transmits the voice of the user U1 and does not transmit the voice of the user U2. That is, the microphone device 1 can extract and transmit the voice of the user U1 wearing the microphone device 1.

Action and Effect

The signal processing device according to the embodiment of the present disclosure includes a determination means that determines whether a first condition is satisfied by the relationship between a first signal, which is based on the output of the first microphone 11 inserted into an ear canal of a user U, and a second signal, which is based on the output of a second microphone 12 positioned outside the ear canal, and a signal transmission means that, if a determination was made that the first condition is satisfied, starts processing relating to the transmission of a sound signal, and that continues the processing, even after the first condition is no longer satisfied, during a period in which a second condition which differs from the first condition is satisfied.

The signal processing device starts and continues processing related to sound signal transmission based on the first condition and the second condition. Thereby, the signal processing device can improve versatility in extracting the voice of the user U.

Further, the first signal of the signal processing device is output based on sounds picked up by the first microphone 11 due to conduction of vibrations through the air, and the second signal is output based on sounds picked up by the second microphone 12 due to the conduction of vibrations through the air.

The signal processing device starts and continues processing related to transmission of a sound signal based on the sounds picked up by the conduction of vibrations through the air. Therefore, the signal processing device can extract the voice of the user U without using a microphone that picks up sound by conduction of vibrations through bone as the first microphone 11 or the second microphone 12. Thereby, the signal processing device can improve versatility in extracting the voice of the user U.

The first condition in the signal processing device is that the sound pressure level indicated by the first signal is higher than the sound pressure level indicated by the second signal.

The signal processing device starts and continues processing related to transmission of a sound signal based on the sound pressure level indicated by the first signal and the sound pressure level indicated by the second signal. Thereby, the signal processing device can improve versatility in extracting the voice of the user U.

The signal processing device further includes a detection means for determining whether or not the sound pressure level indicated by the first signal is equal to or greater than a preset first threshold. The second condition is that the sound pressure level indicated by the first signal is determined by the detection means to be equal to or greater than the first threshold. The signal transmission means starts processing related to transmission of the first signal when it is determined that the first condition is satisfied, and continues the processing, even after the first condition is no longer satisfied, during a period in which the second condition is satisfied.

The signal processing device starts transmitting the first signal when the detection means determines that the sound pressure level indicated by the first signal is equal to or greater than the first threshold. That is, the signal processing device starts transmitting the first signal when the detection means detects the beginning of a section with sound. Thereby, the signal processing device can improve versatility in extracting the voice of the user U.

The microphone device 1 according to the embodiment of the present disclosure includes the case 10 that has a first portion A that is inserted into an ear canal of the user U and a second portion B that is located outside the ear canal, and that is worn on an ear of the user U, the first microphone 11 provided in the first portion A of the case 10, the second microphone 12 provided in the second portion B of the case 10, and a control means that starts processing relating to transmission of a sound signal when the relationship between the first signal output from the first microphone 11 and the second signal output from the second microphone 12 satisfies a first condition, and continues the processing even after the first condition is no longer satisfied during a period in which a second condition which differs from the first condition is satisfied.

The microphone device 1 starts and continues processing related to sound signal transmission based on the first condition and the second condition. As a result, the microphone device can enhance versatility in extracting the voice of the user U.

The signal processing method according to the embodiment of the present disclosure includes determining whether the relationship between a first signal output from the first microphone 11 inserted in an ear canal of the user U and a second signal output from the second microphone 12 positioned outside the ear canal satisfies a first condition, and if a determination was made that the first condition is satisfied, starts processing relating to the transmission of a sound signal, and continues the processing, even after the first condition is no longer satisfied, during a period in which a second condition which differs from the first condition is satisfied.

Using the signal processing method, it is possible to start and continue the processing related to sound signal transmission based on the first condition and the second condition. As a result, the user U using the signal processing method can extract the voice of the user U with high versatility.

The recording medium according to the embodiment of the present disclosure stores a program that causes a computer to execute determining whether the relationship between a first signal output from the first microphone 11 inserted in an ear canal of the user U and a second signal output from the second microphone 12 positioned outside the ear canal satisfies a first condition, and if a determination was made that the first condition is satisfied, starts processing relating to the transmission of a sound signal, and continues the processing, even after the first condition is no longer satisfied, during a period in which a second condition which differs from the first condition is satisfied.

When the program is executed, it is possible to start and continue processing related to sound signal transmission based on the first condition and the second condition. Thereby, the user U executing the program can extract the voice of the user U with high versatility.

Second Embodiment

The microphone device 1 according to the second embodiment will be described below.

The microphone device 1 according to the second embodiment further includes a noise cancellation unit 17 and a signal cancellation unit 18. The microphone device 1 according to the second embodiment removes noise, extracts the voice of the user U, and transmits the extracted voice to the smartphone 3.

A usage example of the microphone device 1 according to the second embodiment is the same as the usage example shown in FIG. 1.

(Configuration of Microphone Device)

Figure 4:
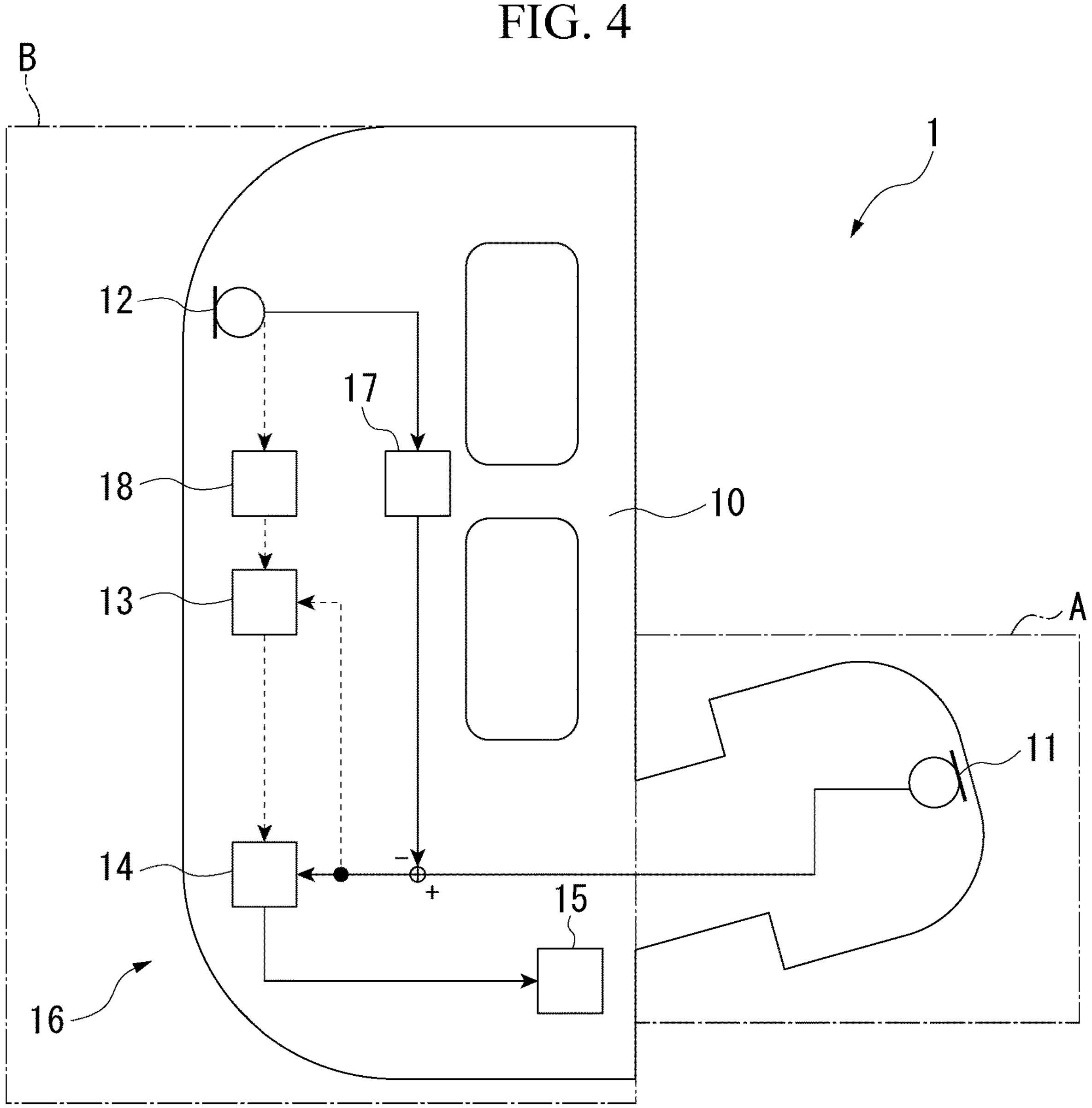
FIG. 4 A diagram showing the configuration of a microphone device according to the second embodiment.

FIG. 4 is a diagram showing a detailed configuration of the microphone device 1. The microphone device 1 is provided with a case 10, the first microphone 11, the second microphone 12, the determination unit 13, the detection unit 14, the signal transmission unit 15, the noise cancellation unit 17, and the signal cancellation unit 18. In the second embodiment, the determination unit 13, the detection unit 14, the signal transmission unit 15, the noise cancellation unit 17, and the signal cancellation unit 18 are collectively referred to as a control unit 16.

Note that the solid arrows in FIG. 4 indicate the flow of electrical signals related to the signal transmission unit 15. The dotted arrows in FIG. 4 indicate the flow of electrical signals pertaining to the determination unit 13.

The microphone device 1 according to the second embodiment is used in a noisy environment. Noise refers to sounds generated by persons or objects other than the user U1 who wears the microphone device 1. An example of noise is a vocal utterance by the user U2. The definition of noise may change depending on the environment in which the microphone device 1 is used.

An electrical signal output by the first microphone 11 based on noise picked up by the first microphone 11 is denoted as IN. An electrical signal output by the second microphone 12 based on noise picked up by the second microphone 12 is denoted as ON.

Unlike the first embodiment, the second microphone 12 according to the second embodiment outputs signals to the noise cancellation unit 17 and the signal cancellation unit 18.

The sound pressure level indicated by ON is greater than the sound pressure level indicated by IN due to the difference in conduction routes from noise emitted outside the user U1. Therefore, if the electrical signals output by the first microphone 11 and the second microphone 12 are used as they are, the determination unit 13 does not determine that the first condition is satisfied.

The noise cancellation unit 17 removes external noise from the signal output from the first microphone 11. The noise cancellation unit 17 is an example of a noise cancellation means.

The first signal is a signal from which external noise has been removed by the noise cancellation unit 17.

The noise cancellation unit 17 removes external noise using a fixed filter. The fixed filter uses a noise cancellation function f1. The noise cancellation function f1 (hereinbelow referred to as f1) is preset such that IN and ON filtered by f1 are similar. The noise cancellation unit 17 receives an electrical signal including ON from the second microphone 12. The electrical signal filtered by the fixed filter of the noise cancellation unit 17 is output from the noise cancellation unit 17. IN, which is external noise, is removed from the electrical signal output from the first microphone 11 based on the electrical signal output from the noise cancellation unit 17. Such noise removal is realized by an adder or the like provided in the microphone device 1.

The detection unit 14 receives the electrical signal from which IN has been removed.

Even in an environment where external noise exists, the detection unit 14 can receive the electrical signal from which IN has been removed. In addition, the signal transmission unit 15 can transmit the electrical signal from which IN has been removed to the smartphone 3. That is, the microphone device 1 can extract and transmit a vocal utterance by the user U1 even in an environment where external noise exists.

The signal cancellation unit 18 removes a predetermined sound from the signal output from the second microphone 12. The signal cancellation unit 18 is an example of a signal cancellation means.

The second signal is a signal from which a predetermined sound has been removed by the signal cancellation unit 18. Examples of the predetermined sound include sounds other than external noise, the voice of the user U1, and the like. Note that the predetermined sound is not limited to the above examples.

The signal cancellation unit 18 removes a predetermined sound using a fixed filter. The fixed filter uses a signal cancellation function g1. The signal cancellation function g1 (hereinbelow referred to as g1) is preset in an environment with low external noise so as to remove OS1 from the electrical signal received from the second microphone 12. The signal cancellation unit 18 transmits the filtered electrical signal to the determination unit 13. In this way, the microphone device 1 can remove OS1 from the electrical signal output by the second microphone 12 by performing filtering by the signal cancellation unit 18 and adding the target signal.

The determination unit 13 performs determination based on the electrical signal from which IN is removed from the electrical signal output by the first microphone 11 and the electrical signal from which OS1 is removed from the electrical signal output by the second microphone 12. Accordingly, when the user U1 makes a vocal utterance, the relationship between the first signal and the second signal satisfies the first condition even in an environment where external noise exists. Therefore, the microphone device 1 can transmit the voice of the user U1 to the smartphone 3.

(Operation of Microphone Device)

The operation of the microphone device 1 according to the second embodiment will be described below.

Figure 5:
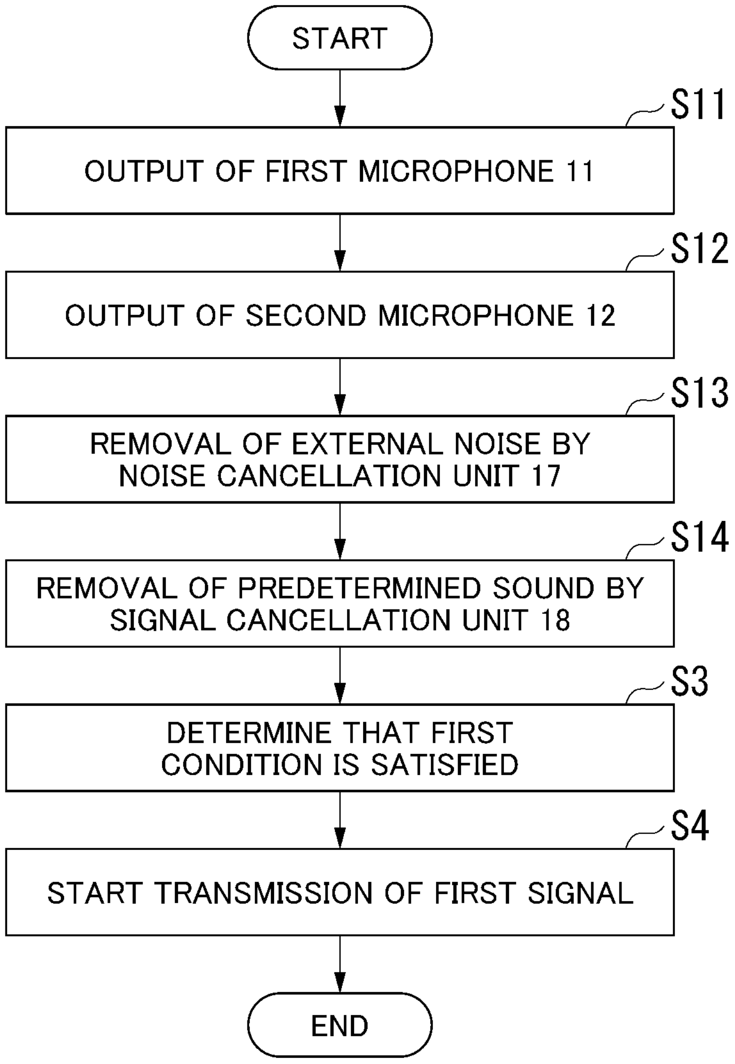
FIG. 5 A flowchart showing the operation of the microphone device according to the second embodiment.

FIG. 5 is a flowchart showing the operation of the microphone device 1 when the user U1 makes a vocal utterance.

The user U1 makes a vocal utterance. The air inside the ear canal of the user U1 vibrates due to the vibration of the skull and muscles of the user U1. In addition, the air inside the ear canal of the user U1 vibrates due to external noise. Thereby, the first microphone 11 outputs IS1 and IN to the determination unit 13 and the detection unit 14 (Step S11).

Subsequently, the air outside the ear canal of the user U1 vibrates. In addition, the air outside the ear canal of the user U1 vibrates due to external noise. Thereby, the second microphone 12 outputs OS1 and ON to the noise cancellation unit 17 and the signal cancellation unit 18 (Step S12).

The noise cancellation unit 17 receives and filters the electrical signal from the second microphone 12. Subsequently, the external noise from the electrical signal output by the first microphone 11 is removed with the filtered electrical signal (Step S13).

The signal cancellation unit 18 receives and filters the electrical signal from the second microphone 12. As a result, a predetermined sound is removed from the electrical signal output from the second microphone 12 (Step S14).

After Step S14, steps S3 and S4 are the same as steps S3 and S4 in the operation of the microphone device 1 according to the first embodiment.

With the above operation, the microphone device 1 can even in an environment with external noise remove the noise and can extract and transmit the vocal utterances of the user U1.

Action and Effect

The signal processing device according to the embodiment of this disclosure is further includes a noise cancellation means for removing external noise from the signal output from the first microphone 11. The first signal is a signal from which external noise has been removed by the noise cancellation means.

The signal processing device can remove external noise from the signal output from the first microphone 11 by the noise cancellation means. Therefore, even in an environment with external noise, the signal processing device can extract and transmit a vocal utterance from which the external noise has been removed.

Further, the signal processing device further includes a signal cancellation means for removing a predetermined sound from the signal output from the second microphone 12. The second signal is a signal from which a predetermined sound has been removed by the signal cancellation means.

The signal processing device can remove a predetermined sound from the signal output from the second microphone 12 by the signal cancellation means. Therefore, the determination means can make a determination based on the second signal from which the predetermined sound has been removed. This allows the signal processing device to start and continue transmission of the first signal even in an environment with external noise.

Third Embodiment

The microphone device 1 according to the third embodiment will be described below.

The noise cancellation unit 17 according to the third embodiment removes external noise using an adaptive filter instead of a fixed filter. Also, the signal cancellation unit 18 according to the third embodiment removes a predetermined sound using an adaptive filter instead of a fixed filter. Detailed configurations and operations of the noise cancellation unit 17 and the signal cancellation unit 18 will be described later.

A usage example of the microphone device 1 according to the third embodiment is the same as the usage example shown in FIG. 1.

External noise exists in the usage environment of the microphone device 1 according to the third embodiment.

External noise has different feature quantities depending on its type. Therefore, when external noise is removed using a fixed filter, some noise may not be removed depending on the type of noise. The microphone device 1 according to the third embodiment uses an adaptive filter whose filter is updated instead of a fixed filter. As a result, the microphone device 1 can remove external noise and the like by performing different processing according to the feature quantity of the external noise.

(Configuration of Microphone Device)

The configuration of the microphone device 1 according to the third embodiment will be described below.

The configuration of the microphone device 1 according to the third embodiment is a configuration in which an adder is further included in the configuration of the microphone device 1 according to the second embodiment.

Figure 6:
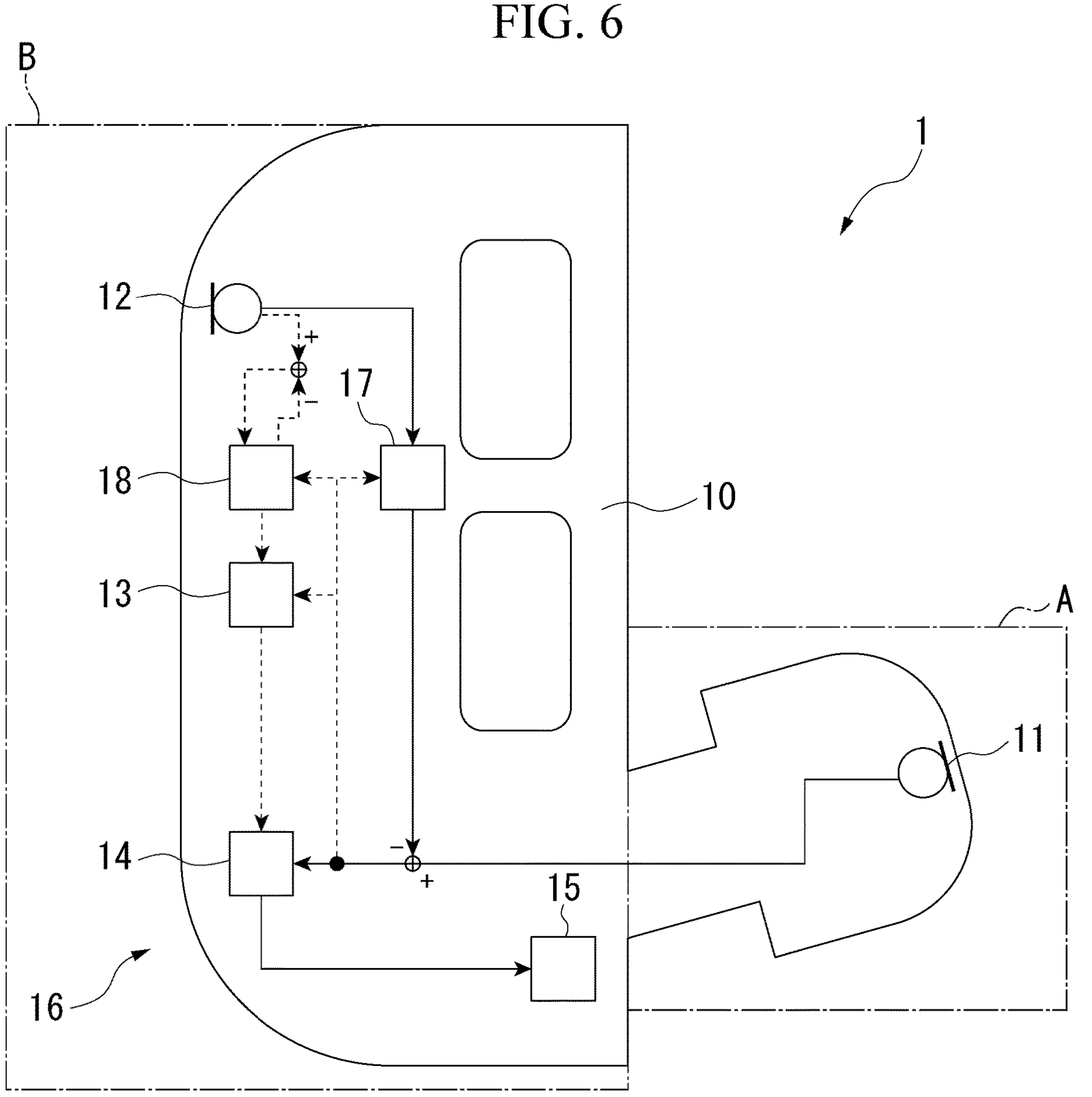
FIG. 6 A diagram showing the configuration of a microphone device according to the third embodiment.

Note that the solid arrows shown in FIG. 6 indicate the flow of electrical signals pertaining to the signal transmission unit 15. The dotted arrows shown in FIG. 6 indicate the flow of electrical signals pertaining to the determination unit 13.

Figure 7:
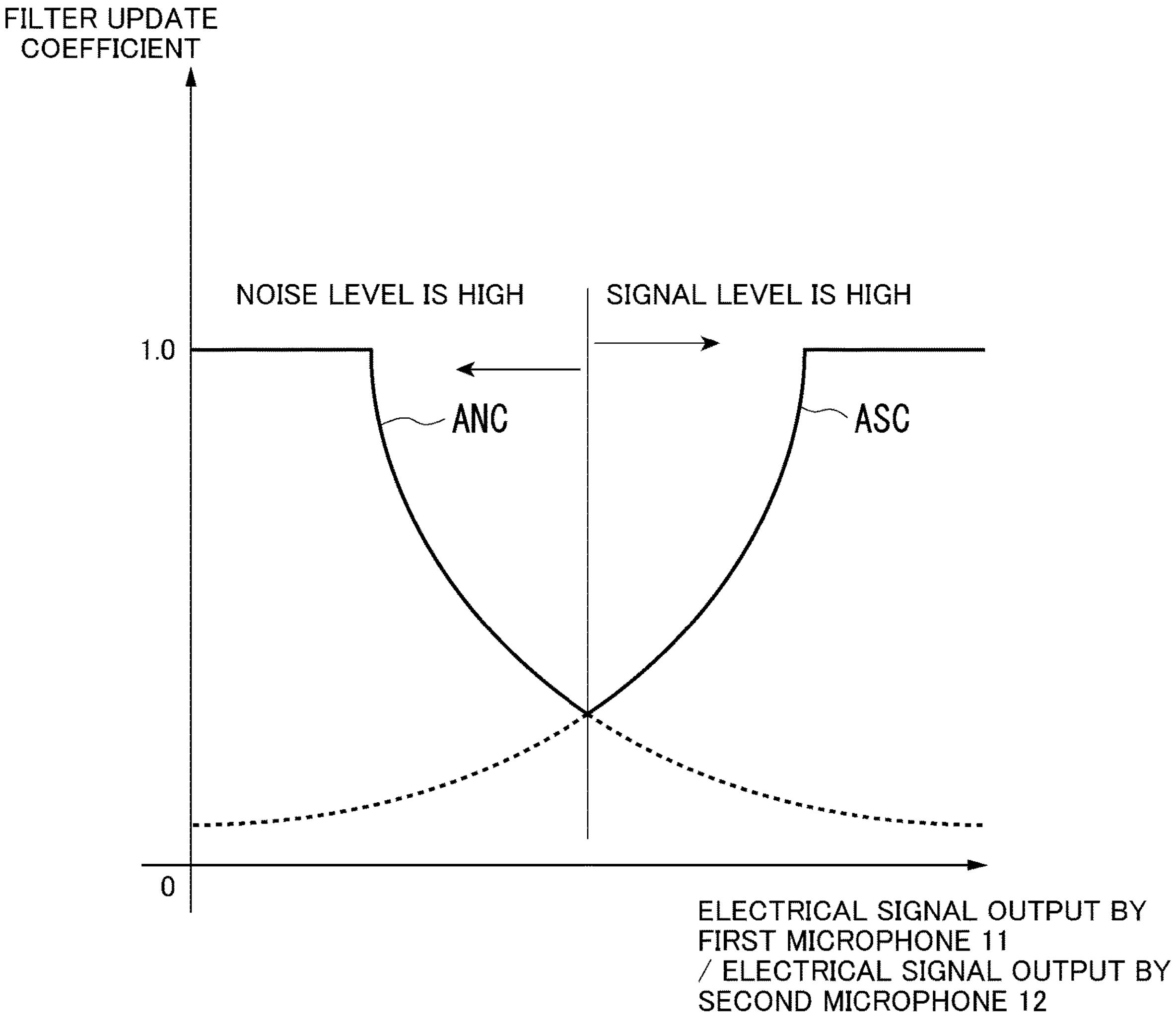
FIG. 7 A diagram showing filter configuration coefficients according to the third embodiment.

The noise cancellation unit 17 according to the third embodiment performs adaptive noise cancellation (ANC) processing. The noise cancellation unit 17 according to the second embodiment uses a fixed filter. f1 used by the fixed filter is a preset fixed value. On the other hand, the noise cancellation unit 17 according to the third embodiment uses an adaptive filter. FIG. 7 is a graph showing filter update coefficients. The adaptive filter of the noise cancellation unit 17 is updated based on the update coefficient indicated by the solid arrow indicating ANC in FIG. 7. That is, the noise cancellation unit 17 performs different ANC processing corresponding to the feature quantity of the external noise.

The microphone device 1 transmits the sound from which noise has been removed by the adaptive filter to the smartphone 3.

Thereby, the microphone device 1 can extract a vocal utterance of the user U1 and transmit the vocal utterance based on the processing corresponding to the feature quantity of the external noise.

The signal cancellation unit 18 according to the third embodiment performs adaptive signal cancellation (ASC) processing.

The signal cancellation unit 18 according to the second embodiment uses a fixed filter. g1 used by the fixed filter is a preset fixed value. On the other hand, the signal cancellation unit 18 according to the third embodiment uses an adaptive filter. The adaptive filter of the signal cancellation unit 18 is updated based on the update coefficient indicated by solid arrow indicating ASC in FIG. 7. That is, the signal cancellation unit 18 performs different ASC processing corresponding to a predetermined sound feature quantity.

In addition, the signal cancellation unit 18 according to the third embodiment removes the predetermined sound based on the first signal. That is, the signal cancellation unit 18 performs adaptive signal cancellation processing based on the first signal from which noise has been removed by the noise cancellation unit 17.

Considering the applied filter and the timing at which sound is picked up, it is possible to convert IS1 to OS1, but it is difficult to convert IN to ON or remove IN with a filter.

(Operation of Microphone Device)

The operation of the microphone device 1 according to the third embodiment will be described below.

Figure 8:
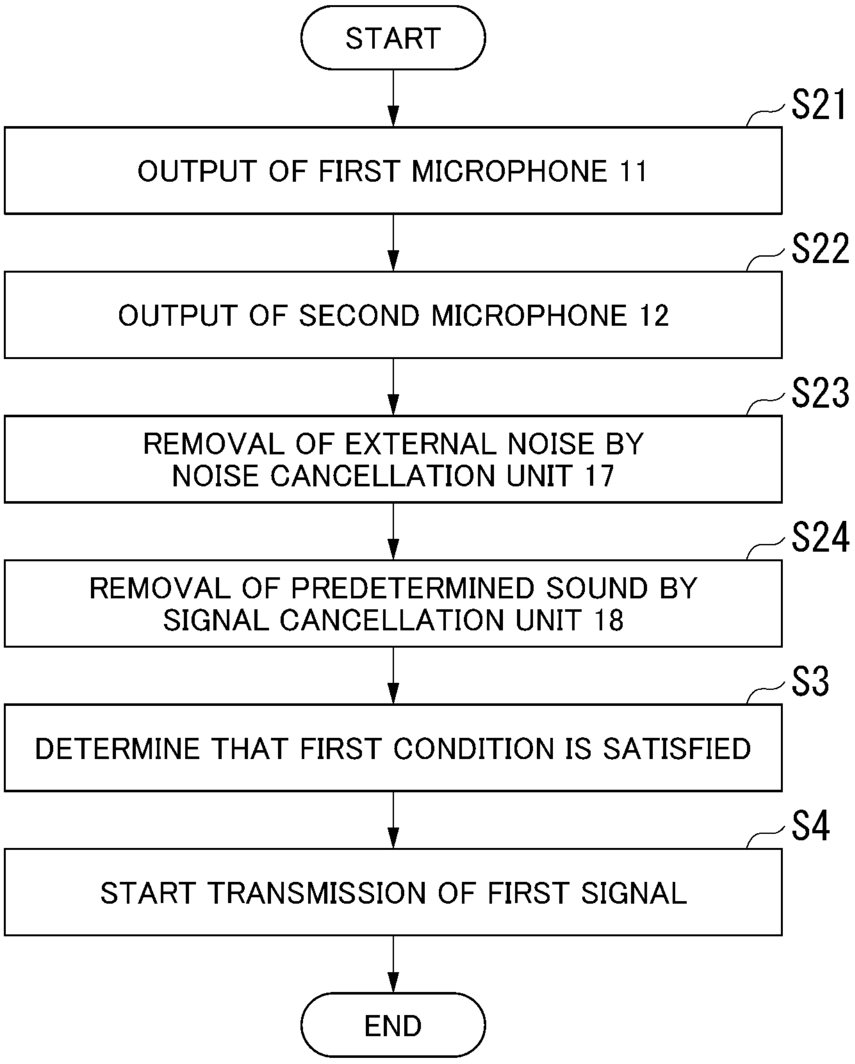
FIG. 8 A flowchart showing the operation of the microphone device according to the third embodiment.

FIG. 8 is a flowchart showing the operation of a microphone device 1 according to the third embodiment.

The user U1 makes a vocal utterance. The air inside the ear canal of the user U1 vibrates due to the vibration of the skull and muscles of the user U1. In addition, the air inside the ear canal of the user U1 vibrates due to external noise. Thereby, the first microphone 11 outputs IS1 and IN to the determination unit 13 and the detection unit 14 (Step S21).

Subsequently, the air outside the ear canal of the user U1 vibrates. In addition, the air outside the ear canal of the user U1 vibrates due to external noise. Thereby, the second microphone 12 outputs OS1 and ON to the noise cancellation unit 17 and the signal cancellation unit 18 (Step S22).

The noise cancellation unit 17 receives and filters the electrical signals from the first microphone 11 and the second microphone 12. Subsequently, the external noise from the electrical signal output by the first microphone 11 is removed with the filtered electrical signal (Step S23).

The signal cancellation unit 18 receives and filters electrical signals and the like from the first microphone 11 and the second microphone 12. As a result, a predetermined sound is removed from the electrical signal output from the second microphone 12 (Step S24).

After Step S24, steps S3 and S4 are the same as steps S3 and S4 in the operation of the microphone device 1 according to the first embodiment.

By the above operation, the microphone device 1 can perform processing corresponding to the feature quantity of the external noise, and extract and transmit the voice of the user U1. Further, the microphone device 1 can perform processing for removing a predetermined sound corresponding to the predetermined sound.

Action and Effect

The noise cancellation means of the microphone device 1 according to the embodiment of this disclosure performs different processing corresponding to the feature quantity of the external noise. The signal cancellation means performs different processing corresponding to the feature quantity of a predetermined sound, and removes the predetermined sound on the basis of the first signal.

The microphone device 1 can perform processing for removing noise according to the feature quantity of external noise, and extract and transmit the voice of the user U1.

Fourth Embodiment

The microphone device 1 according to the fourth embodiment will be described below.

The configuration of the microphone device 1 according to the fourth embodiment is a configuration in which a filter storage device 30 is added to the configuration of the microphone device 1 according to the third embodiment. The configuration of the filter storage device 30 will be described later.

A usage example of the microphone device 1 according to the fourth embodiment is the same as the usage example shown in FIG. 1.

(Configuration of Microphone Device)

The configuration of the microphone device 1 according to the fourth embodiment will be described below. The location of the filter storage device 30 shown in FIG. 9 is an example.

Figure 9:
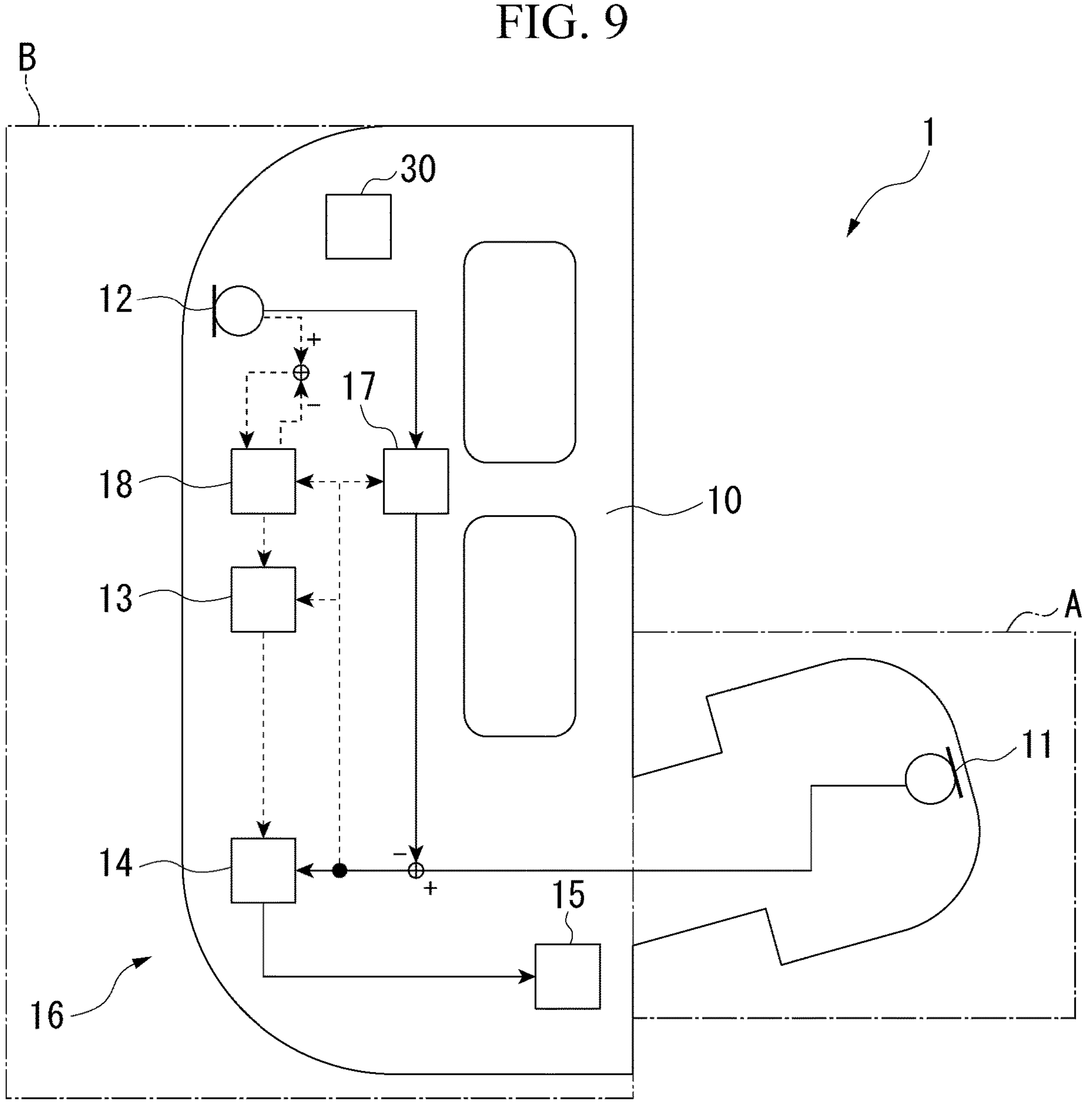
FIG. 9 A diagram showing the configuration of a microphone device according to the fourth embodiment.

Note that the solid arrows in FIG. 9 indicate the flow of electrical signals pertaining to the signal transmission unit 15. The dotted arrows in FIG. 9 indicate the flow of electrical signals pertaining to the determination unit 13.

(Configuration of Filter Storage Device)

The configuration of the filter storage device 30 will be described below.

The filter storage device 30 stores noise filters and signal filters. A noise filter is a filter used when the noise cancellation unit 17 removes external noise. A signal filter is a filter used when the signal cancellation unit 18 removes a predetermined sound.

Figure 10:
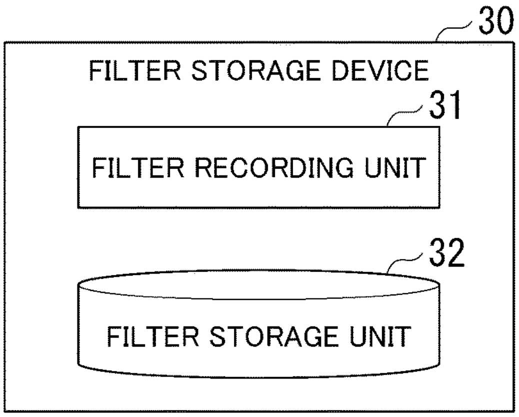
FIG. 10 A diagram showing the configuration of a filter storage device according to the fourth embodiment.

FIG. 10 is a diagram showing the configuration of the filter storage device 30. As shown in FIG. 10, the filter storage device 30 includes a filter recording unit 31 and a filter storage unit 32.

The filter recording unit 31 acquires the noise filter from the noise cancellation unit 17. Also, the filter recording unit 31 acquires the signal filter from the signal cancellation unit 18. The filter recording unit 31 records the acquired noise filter or signal filter in the filter storage unit 32. The filter recording unit 31 is an example of a recording means.

The filter storage unit 32 stores noise filters or signal filters. The filter storage unit 32 is an example of a storage means.

The noise cancellation unit 17 performs ANC processing on the basis of the noise filters stored in the filter storage unit 32.

The signal cancellation unit 18 performs ASC processing on the basis of the signal filters stored in the filter storage unit 32.

The noise cancellation unit 17 or the signal cancellation unit 18 generates an optimum filter through learning. However, the noise cancellation unit 17 or the signal cancellation unit 18 requires a lot of data for learning. Depending on when the microphone device 1 is used, the noise cancellation unit 17 or the signal cancellation unit 18 may not be sufficiently trained. In such a case, the signal cancellation unit 18 performs learning based on the signal from which the external noise has been removed by the noise cancellation unit 17, resulting in a more inadequate learning state.

In this case, the noise cancellation unit 17 or the signal cancellation unit 18 cannot sufficiently remove external noise or a predetermined sound.

The microphone device 1 according to the fourth embodiment uses the past filter learning information recorded in the filter storage device 30. For example, when the microphone device 1 is activated, the microphone device 1 connects to the filter storage device to call up the noise filter or signal filter. As a result, the microphone device 1 can remove external noise or a predetermined sound using a more optimal filter.

Note that the filter storage device 30 may include a model learning unit. The model learning unit uses the sound picked up by the microphone device 1 as an input variable and the noise filter stored in the filter storage unit 32 as an objective variable to generate a learned model M1. The model learning unit uses the sound picked up by the microphone device 1 as an input variable and the signal filter stored in the filter storage unit 32 as an objective variable to generate a learned model M2. The model learning unit records the trained model M1 or the trained model M2 in the filter storage unit 32.

The filter storage device 30 may also include a filter identification unit. The filter identification unit inputs the sound picked up by the microphone device 1 to the trained model M1 or the trained model M2 to identify a noise filter or a signal filter.

(Operation of Microphone Device)

The operation of the microphone device 1 according to the fourth embodiment will be described below.

Figure 11:
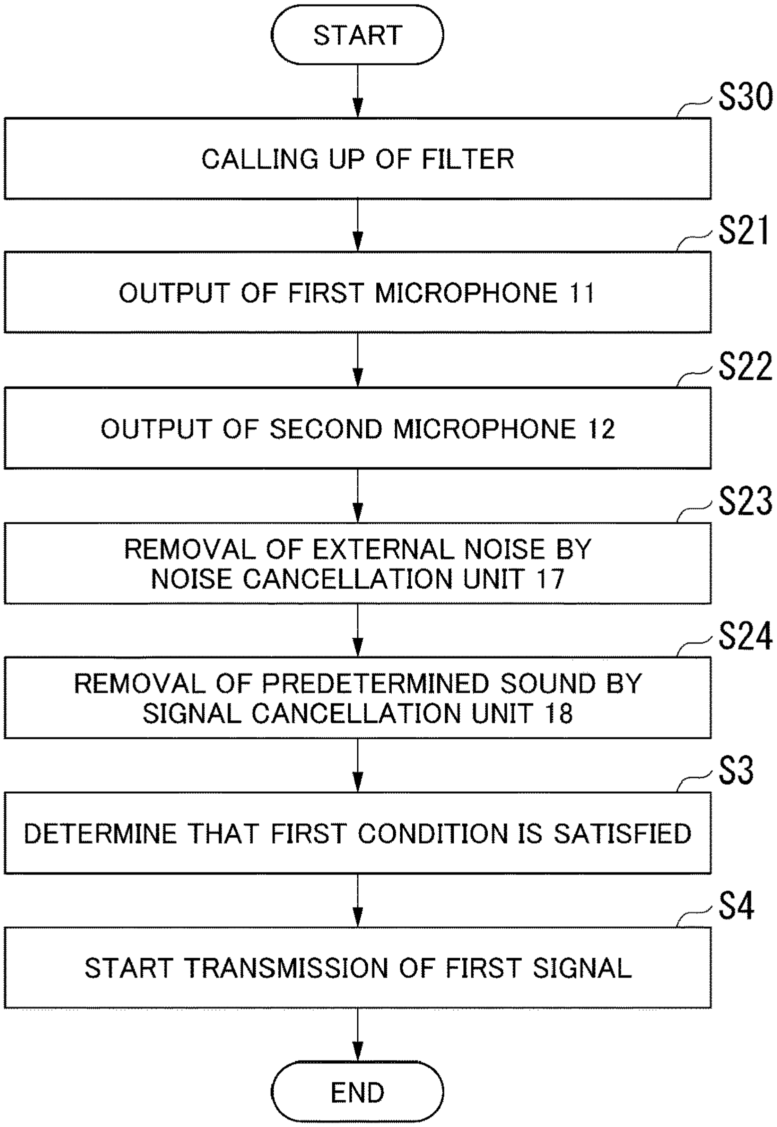
FIG. 11 A flowchart showing the operation of a microphone device according to the fourth embodiment.

FIG. 11 is a flowchart showing the operation of a microphone device 1 according to the fourth embodiment.

When the microphone device 1 is activated, the noise cancellation unit 17 calls up a noise filter from the filter storage unit 32. In addition, the signal cancellation unit 18 calls up a signal filter from the filter storage unit 32 (Step S30).

The operations from Step S21 to Step S24 are the same as the operations from Step S21 to Step S24 of the operation of the microphone device 1 according to the third embodiment.

After Step S24, steps S3 and S4 are the same as the operation of the microphone device 1 according to the first embodiment.

Action and Effect

The signal processing device according to an embodiment of the present disclosure further includes a recording means that records in the storage means a noise filter used when external noise is removed by the noise cancellation means and a signal filter used when a predetermined sound is removed by the signal cancellation mean. The noise cancellation means removes external noise based on the noise filter recorded in the storage means, and the signal cancellation means removes a predetermined sound based on the signal filter recorded in the storage means.

The signal processing device removes external noise or a predetermined sound using the noise filter or signal filter recorded in the storage means. Thereby, the signal processing device can remove external noise and the like based on the recorded filter, and extract and transmit the voice of the user U.

Fifth Embodiment

The microphone device 1 according to the fifth embodiment will be described below.

The microphone device 1 according to the fifth embodiment does not include the filter storage unit 32 unlike the microphone device 1 according to the fourth embodiment. Also, the microphone device 1 according to the fifth embodiment is connected to an external device 40 by wire or wirelessly. The configuration of the external device 40 will be described later.

A usage example of the microphone device 1 according to the fifth embodiment is the same as the usage example shown in FIG. 1.

(Configuration of Microphone Device)

The configuration of the microphone device 1 according to the fifth embodiment will be described below.

Figure 12:
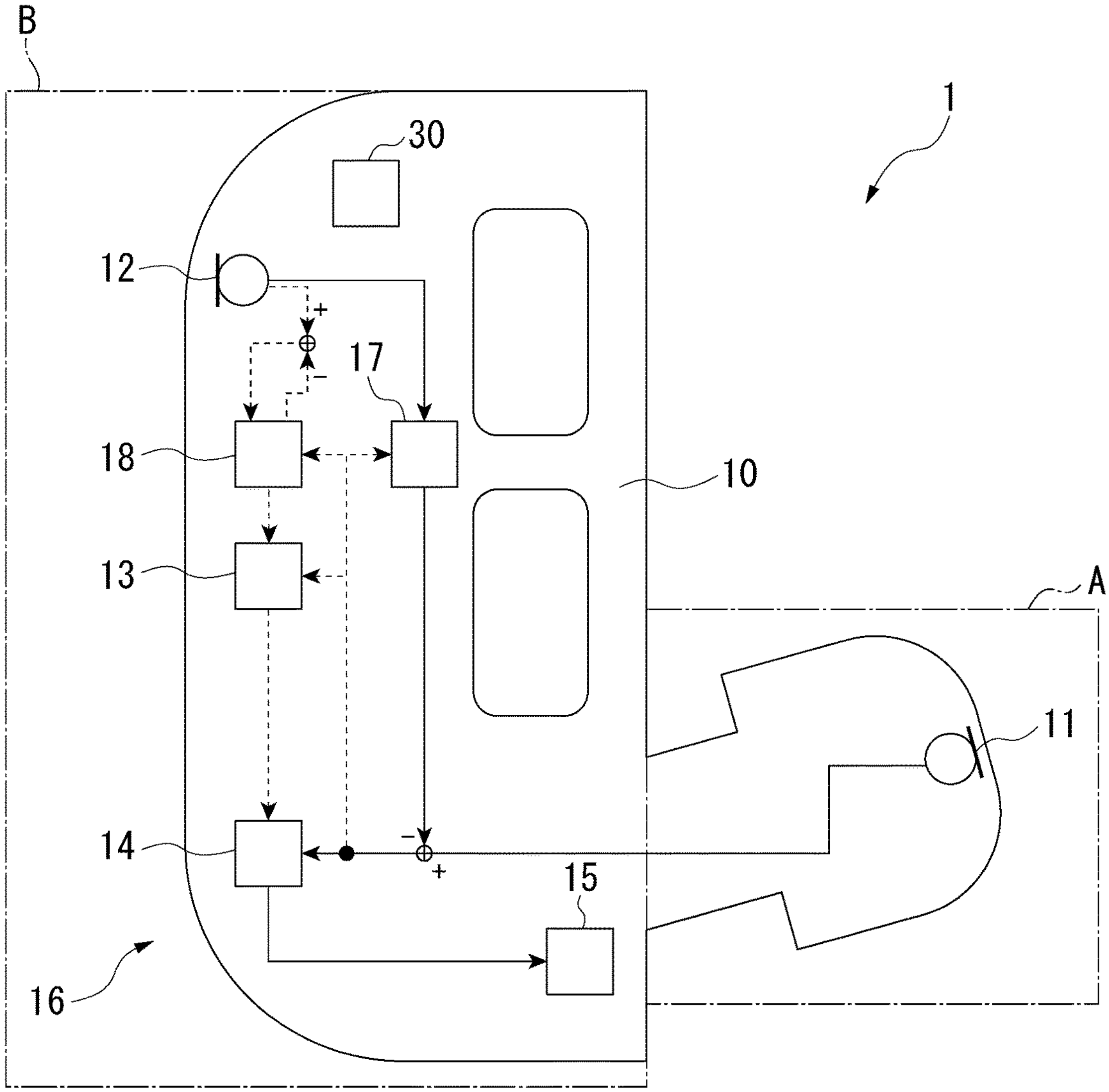
FIG. 12 A diagram showing the configuration of a microphone device according to the fifth embodiment.
Figure 13:
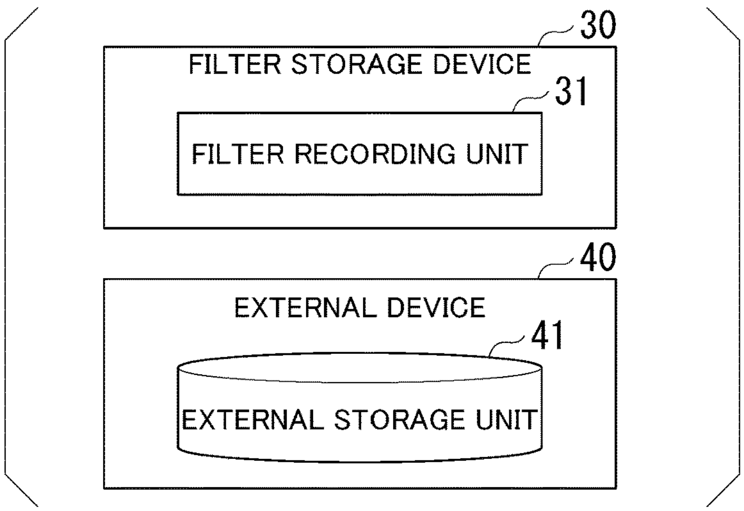
FIG. 13 A diagram showing the configurations of a filter storage device and an external device according to the fifth embodiment.

FIG. 12 is a diagram showing the configuration of the microphone device 1. The configuration of the microphone device 1 other than the filter storage device 30 in the fifth embodiment is the same as that in the fourth embodiment. FIG. 13 is a diagram showing the configuration of the filter storage device 30 and the external device 40.

Note that the solid arrows shown in FIG. 12 indicate the flow of electrical signals pertaining to the signal transmission unit 15. The dotted arrows shown in FIG. 12 indicate the flow of electrical signals pertaining to the determination unit 13.

The filter recording unit 31 receives the noise filter from the noise cancellation unit 17 and transmits the noise filter to the external device 40. The filter recording unit 31 receives the signal filter from the noise cancellation unit 18 and transmits the signal filter to the external device 40.

The noise cancellation unit 17 removes external noise based on the noise filter recorded in the external device 40.

The signal cancellation unit 18 removes a predetermined sound based on the signal filter recorded in the external device 40.

As in the microphone device 1 according to the fourth embodiment, the noise filter or signal filter may be called up from the external device 40 when the device is activated.

(Configuration of External Device)

The configuration of the external device 40 is described below. The external device 40 is a device that stores noise filters or signal filters. The external device 40 includes an external storage unit 41.

The external device 40 receives a noise filter or a signal filter from the filter recording unit 31. The external device 40 records the received noise filter or signal filter in the external storage unit 41.

The external storage unit 41 stores noise filters or signal filters.

This allows the contents of the external storage unit 41 to be updated without having to switch the internal device of the microphone device 1. That is, the user U of the microphone device 1 can easily update the filter used by the microphone device 1 by replacing the external device 40.

(Operation of Microphone Device)

The operation of the microphone device 1 according to the fifth embodiment is the same as the operation of the microphone device 1 according to the fourth embodiment.

Action and Effect

The noise cancellation means of the signal processing device according to the embodiment of the present disclosure removes external noise based on the noise filter recorded in the external device 40 connected to the signal processing device. The signal cancellation means removes predetermined sounds based on signal filters recorded in the external device 40.

The signal processing device records filters in the external device 40. As a result, the contents of the external storage unit 41 can be updated without switching the internal device of the signal processing device. That is, the user U of the signal processing device can easily update the filter used by the signal processing device 1 by replacing the external device 40.

Sixth Embodiment

The microphone device 1 according to the sixth embodiment will be described below.

The microphone device 1 according to the sixth embodiment further includes a speaker 19 and an authentication unit 20 in addition to the configuration of the microphone device 1 according to the fourth embodiment.

A usage example of the microphone device 1 according to the sixth embodiment is the same as the usage example shown in FIG. 1.

(Configuration of Microphone Device)

Figure 14:
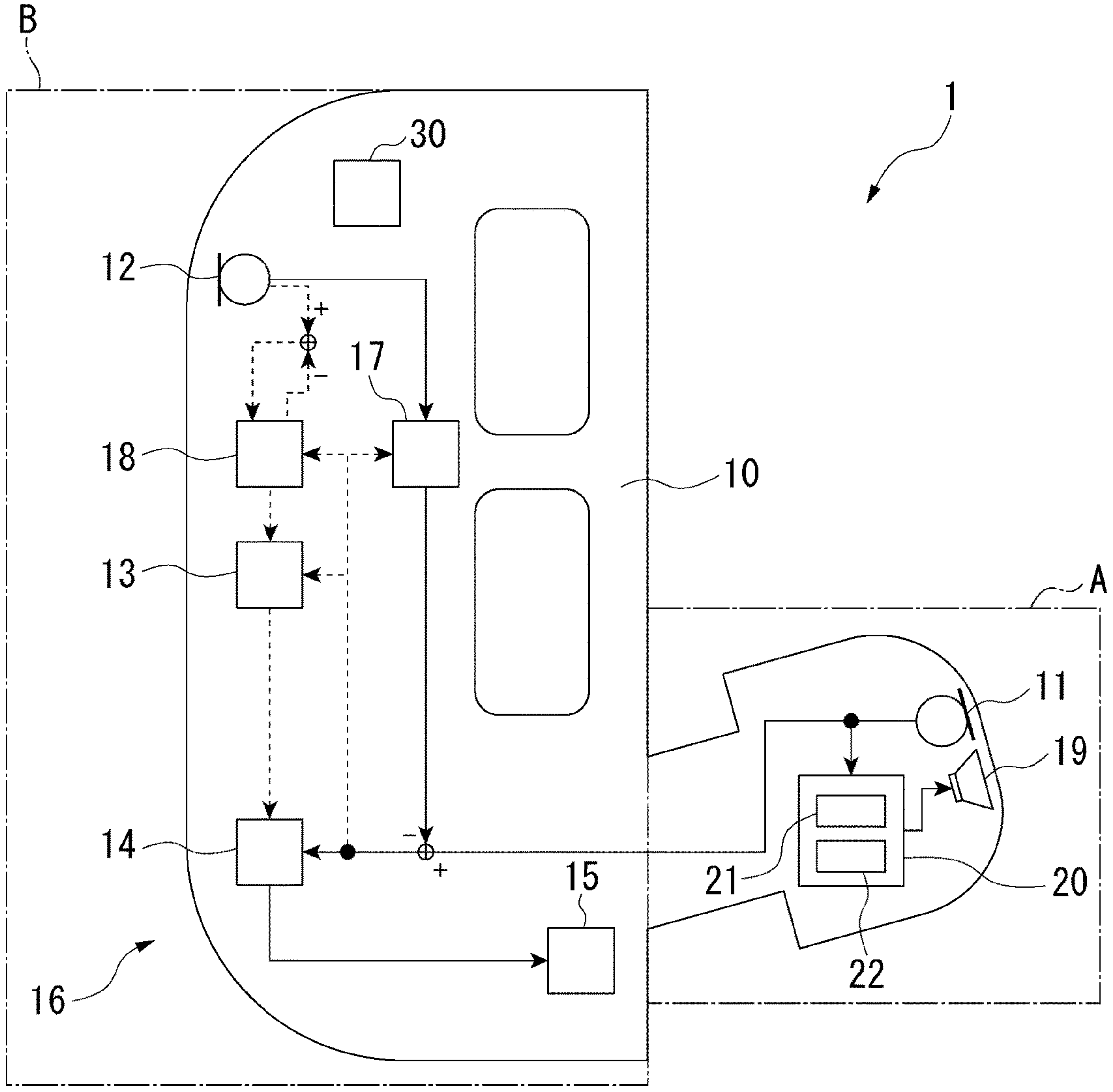
FIG. 14 A diagram showing the configuration of a microphone device according to the sixth embodiment.

The configuration of the microphone device 1 according to the sixth embodiment will be described below. FIG. 14 is a diagram showing the configuration of the microphone device 1.

Note that the solid arrows shown in FIG. 14 indicate the flow of electrical signals pertaining to the signal transmission unit 15. The dotted arrows shown in FIG. 14 indicate the flow of electrical signals pertaining to the determination unit 13.

The speaker 19 transmits sound to an ear canal of the user U. The speaker 19 receives an electrical signal from the authentication unit 20. The speaker 19 converts the received electrical signal into a mechanical vibration. The mechanical vibration produced by the speaker 19 sends sound into the ear canal of the user U.

The noise cancellation unit 17 removes external noise on the basis of the noise filter specified by the authentication unit 20.

The signal cancellation unit 18 removes a predetermined sound on the basis of the signal filter specified by the authentication unit 20.

The filter recording unit 31 records information that associates the noise filter with the user U1. The filter recording unit 31 also records information that associates the signal filter with the user U1.

The filter storage unit 32 stores the information that associates the noise filter with the user U1 and the information that associates the signal filter with the user U1.

(Configuration of Authentication Unit)

The configuration of the authentication unit 20 will be described below. The authentication unit 20 identifies a noise filter or signal filter based on the sound emitted by the speaker 19.

The authentication unit 20 includes a user identification unit 21 and a filter identification unit 22.

The user identification unit 21 identifies the user U wearing the microphone device 1 based on the sound emitted by the speaker 19. The user identification unit 21 is an example of a user identification means.

When the speaker 19 emits sound, the ear canal of the user U produces reverberation. Each user U has an ear canal with a different structure. Therefore, the reverberation generated by each user U also differs. The reverberation is picked up by the first microphone 11. The user identification unit 21 identifies the user U by collating the electrical signal indicating the reverberation received from the first microphone 11 with information that associates reverberation information with the user U.

The filter identification unit 22 collates the user U identified by the user identification unit 21 with information stored in the filter storage unit 32 to identify a noise filter or a signal filter. The filter identification unit 22 is an example of a filter identification means.

(Operation of Microphone Device)

The operation of the microphone device 1 according to the sixth embodiment will be described below.

Figure 15:
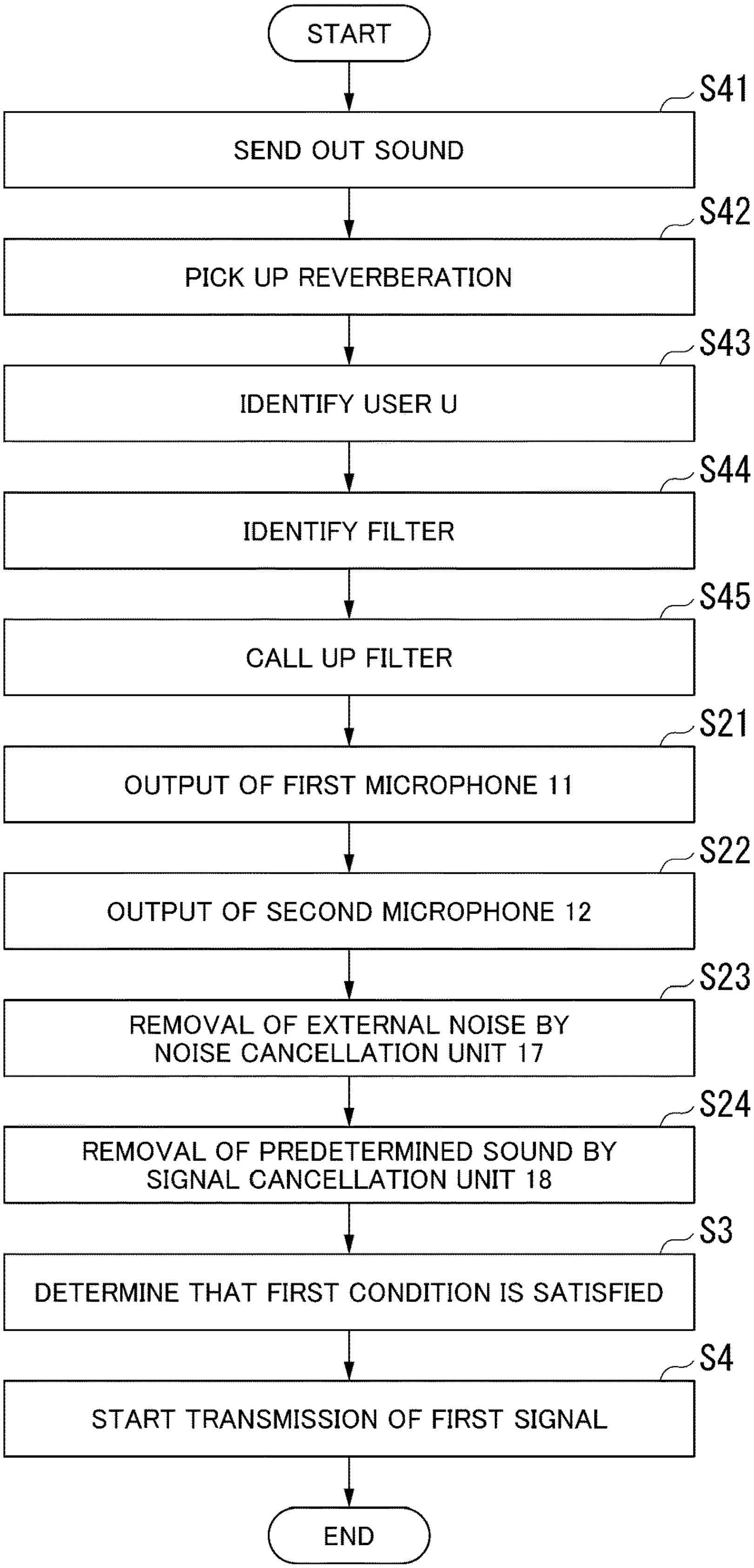
FIG. 15 A flowchart showing the operation of the microphone device according to the sixth embodiment.

FIG. 15 is a flowchart showing the operation of a microphone device 1 according to the sixth embodiment.

When the user U1 wears the microphone device 1, the authentication unit 20 sends out sound from the speaker 19 (Step S41).

The sound sent out in Step S41 reverberates in the ear canal of user U1. The first microphone 11 picks up the reverberation (Step S42).

The user identification unit 21 receives the electrical signal of the reverberation and identifies the user U (Step S43).

The filter identification unit 22 collates the user U identified in Step S43 with the information stored in the filter storage unit 32 to identify the filter (Step S44).

The noise cancellation unit 17 calls up the noise filter identified in Step S44.

Also, the signal cancellation unit 18 calls up the signal filter identified in Step S44 (Step S45).

The operations from Step S21 to Step S24 are the same as the operations from Step S21 to Step S24 of the operation of the microphone device 1 according to the third embodiment.

After Step S24, steps S3 and S4 are the same as the operation of the microphone device 1 according to the first embodiment.

The microphone device 1 can identify the user U with the authentication unit 20. Therefore, the microphone device 1 can use the filters recorded in association with the user U to remove external noise or predetermined sounds. Thereby, the microphone device 1 can use filters recorded in the past for each user U and reduce filter training time.

Action and Effect

The signal processing device according to the embodiment of the present disclosure further includes a speaker 19 that sends out sound to an ear canal of the user U, a user identification means that identifies the user U based on the sound sent out by the speaker 19, and a filter identification means that identifies the noise filter or the signal filter associated with the user U identified by the user identification means, among the noise filters or signal filters recorded in the storage means. The noise cancellation means removes external noise on the basis of the noise filter identified by the filter identification means. The signal cancellation means removes a predetermined sound on the basis of the signal filter identified by the filter identification means.

The signal processing device can identify the user U by the user identification means. Therefore, the signal processing device can use the filters recorded in association with the user U to remove external noise or predetermined sounds. Thereby, the signal processing device can use filters recorded in the past for each user U and reduce filter training time.

Seventh Embodiment

The microphone device 1 according to the seventh embodiment will be described below.

The configuration of the microphone device 1 according to the seventh embodiment is a configuration in which the speaker 19 and the authentication unit 20 are added to the configuration of the microphone device 1 according to the fifth embodiment. Note that the authentication unit 20 does not include the user specification unit 21 and the filter specification unit 22, unlike the authentication unit 20 according to the sixth embodiment.

A usage example of the microphone device 1 according to the seventh embodiment is the same as the usage example shown in FIG. 1.

(Configuration of Microphone Device)

The configuration of the microphone device 1 according to the seventh embodiment will be described below.

Figure 16:
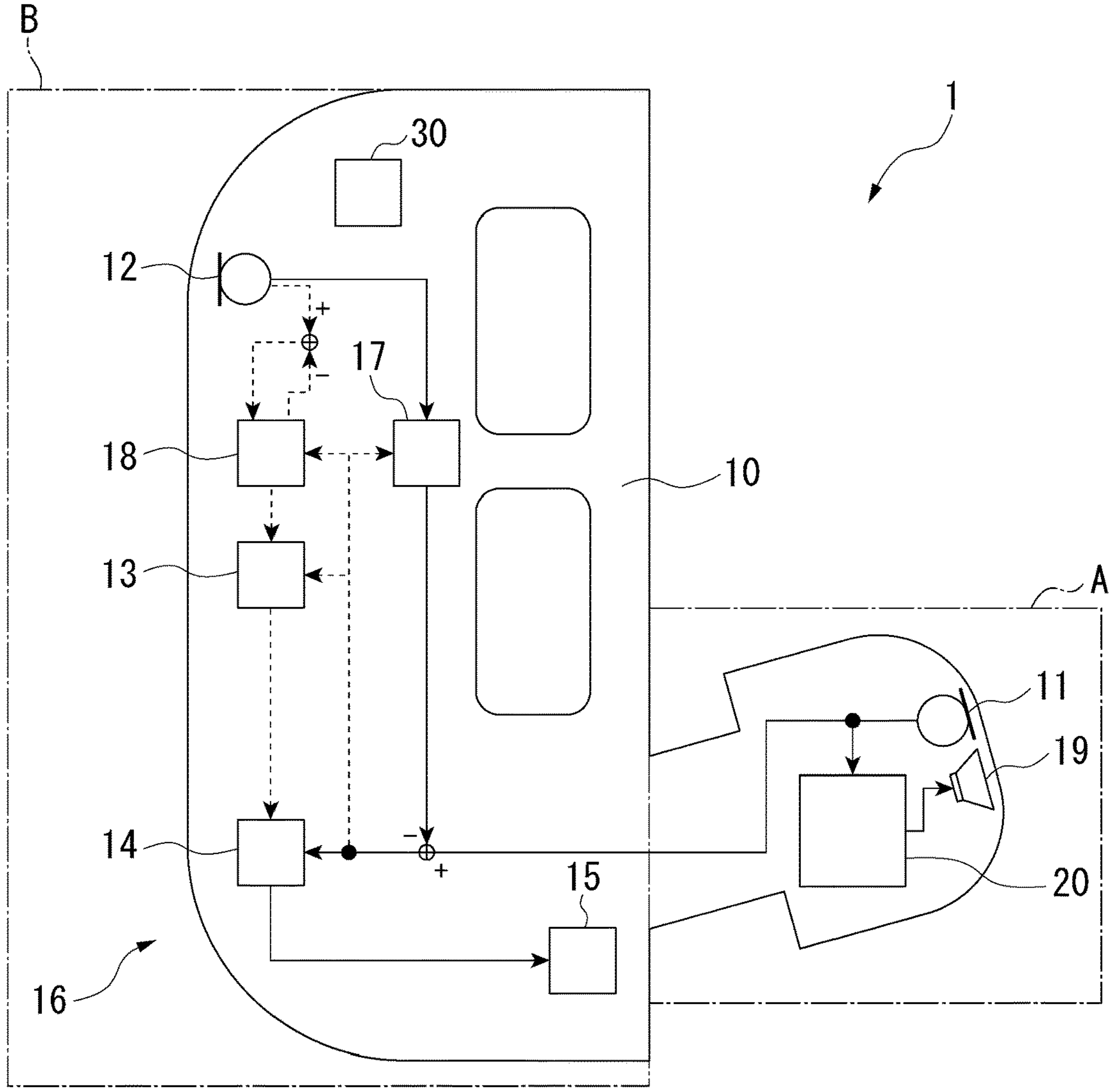
FIG. 16 A diagram showing the configuration of a microphone device according to the seventh embodiment.

FIG. 16 is a diagram showing the configuration of the microphone device 1 according to the seventh embodiment.

Note that the solid arrows shown in FIG. 16 indicate the flow of electrical signals pertaining to the signal transmission unit 15. The dotted arrows shown in FIG. 16 indicate the flow of electrical signals pertaining to the determination unit 13.

The speaker 19 operates similarly to the speaker 19 according to the sixth embodiment.

The authentication unit 20 transmits an electrical signal representing sound to the speaker 19. The authentication unit 20 also transmits the electrical signal received from the first microphone 11 to the external device 40.

(Configuration of External Device)

The configuration of the external device 40 according to the seventh embodiment will be described below.

Figure 17:
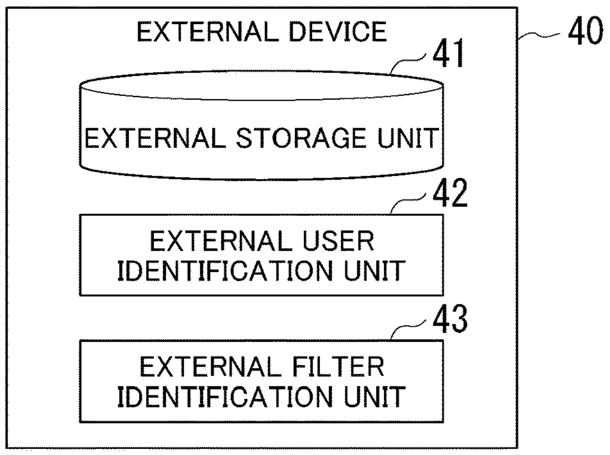
FIG. 17 A diagram showing the configuration of an external device according to the seventh embodiment.

FIG. 17 is a diagram showing the configuration of the external device 40 according to the seventh embodiment. The external device 40 includes the external storage unit 41, an external user identification unit 42, and an external filter identification unit 43.

The external storage unit 41 stores information that associates the user U with a noise filter. The external storage unit 41 also stores information that associates the user U with a signal filter.

The external user identification unit 42 receives an electrical signal representing reverberation from the authentication unit 20. The external user identification unit 42 identifies the user U based on the received electrical signal. For example, the external user identification unit 42 identifies the user U by collating the reverberation information with information that associates reverberation information and the user U. The external user identification unit 42 is an example of a user identification means.

The external filter identification unit 43 collates the user U identified by the external user identification unit 42 with information stored in the external storage unit 41 to identify a noise filter or a signal filter. The external filter identification unit 43 is an example of a filter identification means.

(Operation of Microphone Device)

The operation of the microphone device 1 according to the seventh embodiment will be described below.

Figure 18:
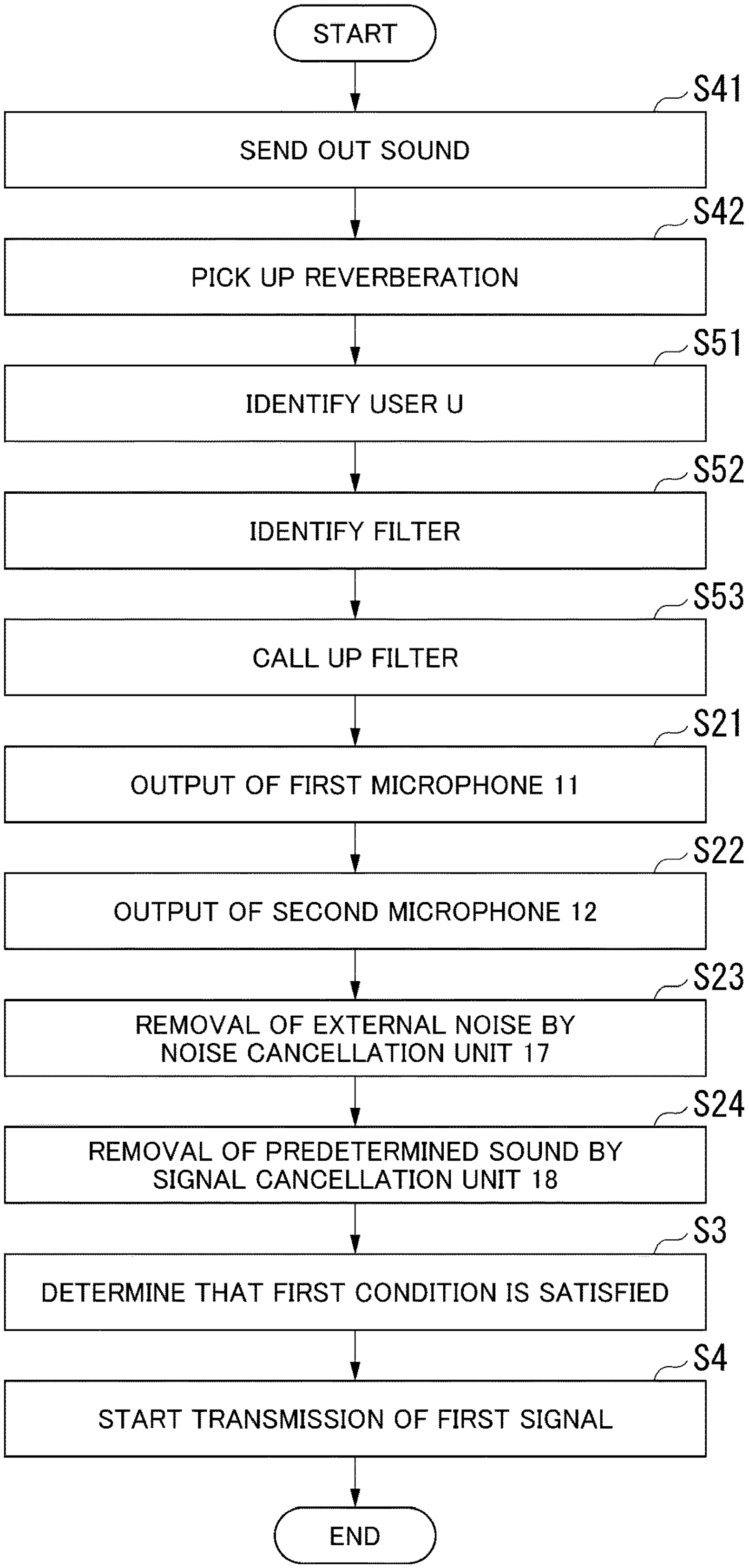
FIG. 18 A flowchart showing the operation of the microphone device according to the seventh embodiment.

FIG. 18 is a flowchart showing the operation of a microphone device 1 according to the seventh embodiment.

Steps S41 and S42 are the same as steps S41 and S42 of the operation of the microphone device 1 according to the sixth embodiment.

The external user identification unit 42 receives the electrical signal of a reverberation sound to identify the user U (Step S51).

The external filter identification unit 43 collates the user U identified in Step S51 with information stored in the external storage unit 41 to identify a filter (Step S52).

The noise cancellation unit 17 calls up the noise filter identified in Step S52. Also, the signal cancellation unit 18 calls up the signal filter identified in Step S52 (Step S53).

The operations from Step S21 to Step S24 are the same as the operations from Step S21 to Step S24 of the operation of the microphone device 1 according to the third embodiment.

After Step S24, steps S3 and S4 are the same as the operation of the microphone device 1 according to the first embodiment.

Action and Effect

The signal processing device according to the embodiment of the present disclosure further includes the speaker 19 that sends sound to an ear canal of the user U. The external device 40 includes a user identification means that identifies the user U based on the sound sent out by the speaker 19, and a filter identification means that identifies a noise filter or a signal filter associated with the user U identified by the user identification means, among the noise filters or signal filters recorded in the external device 40. The noise cancellation means removes external noise on the basis of the noise filter identified by the external device 40. The signal cancellation means removes a predetermined sound on the basis of the signal filter identified by the external device 40.

The signal processing device connects with the external device 40 including a user identification means. The external device 40 can store filters related to many users U. Therefore, the signal processing device can identify many users U.

Thereby, the signal processing device can identify the user U wearing the signal processing device, and extract and transmit the voice.

Eighth Embodiment

The microphone device 1 according to the eighth embodiment will be described below.

The configuration of the microphone device 1 according to the eighth embodiment is a configuration in which an interpolation unit 23 is added to the configuration of the microphone device 1 according to the first embodiment.

A usage example of the microphone device 1 according to the eighth embodiment is the same as the usage example shown in FIG. 1.

(Configuration of Microphone Device)

The configuration of the microphone device 1 according to the eighth embodiment will be described below.

Figure 19:
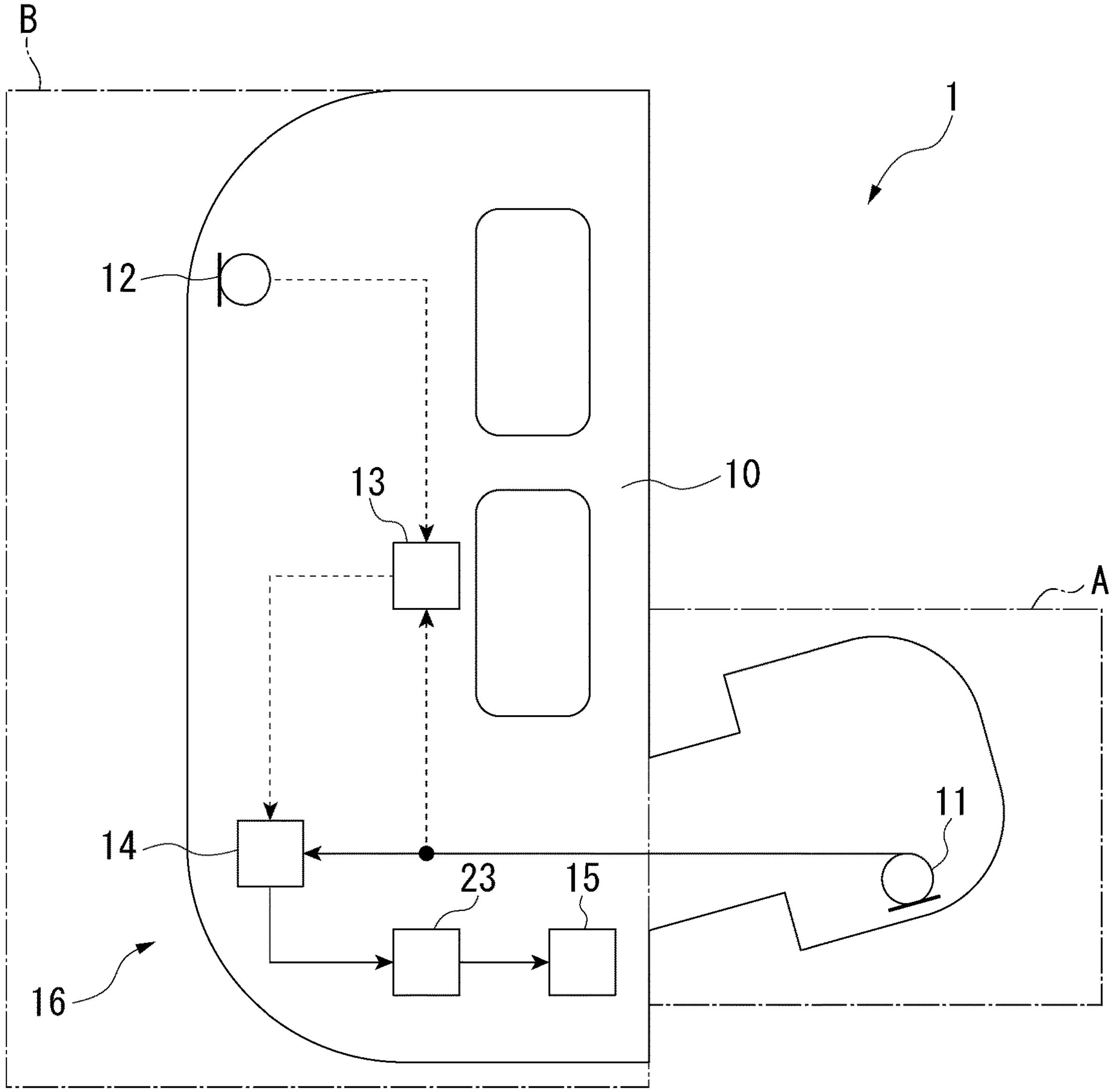
FIG. 19 A diagram showing the configuration of a microphone device according to the eighth embodiment.

FIG. 19 is a diagram showing the configuration of the microphone device 1 according to the eighth embodiment.

Note that the solid arrows shown in FIG. 19 indicate the flow of electrical signals pertaining to the signal transmission unit 15. The dotted arrows shown in FIG. 19 indicate the flow of electrical signals pertaining to the determination unit 13.

The first microphone 11 picks up sound through conduction from the cartilage of the ear canal of the user U1. The first microphone 11 is provided at a location that contacts the cartilage of the ear canal of the user U1. Assume that the user U1 has made a vocal utterance. In this case, the skull and muscles of the user U1 vibrate, and that vibration is transmitted to the ear cartilage of the user U1. The vibration of the cartilage mechanically vibrates the first microphone 11. The first microphone 11 converts the mechanical vibration into an electrical signal and outputs the electrical signal.

The interpolation unit 23 receives and interpolates the first signal from the detection unit 14. The first microphone 11 picks up sound by vibration of the skull and muscles. Therefore, the feature quantity of the first signal is different from the feature quantity of the sound picked up by air vibration. In order to reduce such a difference in feature quantities, the interpolation unit 23 performs interpolation based on the feature quantity of the first signal. An example of the feature quantity of the first signal is the waveform indicated by the first signal. The interpolation unit 23 is an example of an interpolation means.

The signal transmission unit 15 transmits the first signal interpolated by the interpolation unit 23 to the smartphone 3.

(Operation of Microphone Device)

The operation of the microphone device 1 according to the eighth embodiment will be described below.

Figure 20:
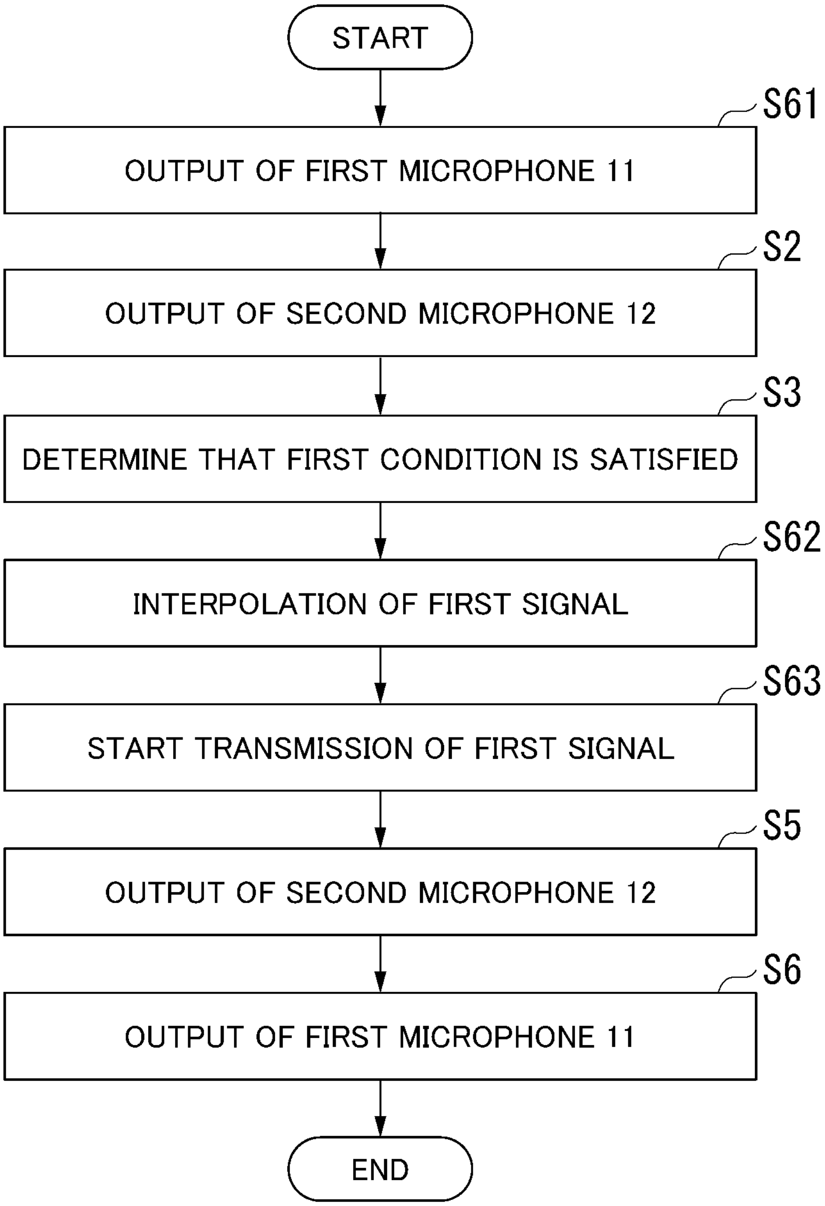
FIG. 20 A flowchart showing the operation of the microphone device according to the eighth embodiment.

FIG. 20 is a flowchart showing the operation of a microphone device 1 according to the eighth embodiment.

The user U1 makes a vocal utterance. The first microphone 11 outputs IS1 to the determination unit 13 and the detection unit 14 due to vibration of the skull and muscles of the user U1 (Step S61).

Steps S2 and S3 are the same as steps S2 and S3 in the operation of the microphone device 1 according to the first embodiment.

The interpolation unit 23 receives the first signal from the detection unit 14 and interpolates the feature quantity of the first signal (Step S62).

The signal transmission unit 15 receives the first signal interpolated by the interpolation unit 23 and starts transmission to the smartphone 3 (Step S63).

Steps S5 and S6 are the same as steps S5 and S6 in the operation of the microphone device 1 according to the first embodiment.

By the above operation, the microphone device 1 can extract and transmit a vocal utterance of the user U1 through the conduction of the cartilage of the ear canal. Also, the microphone device 1 transmits the first signal interpolated by the interpolation unit 23. As a result, it is possible to reduce the sense of uneasiness with respect to the sounds picked up by the conduction of the cartilage of the ear canal.

Action and Effect

The signal processing device according to an embodiment of the present disclosure further includes an interpolation means that interpolates the first signal. The first signal is output based on the sound picked up by the first microphone 11 through the conduction from the cartilage of the ear canal. The signal transmission means starts processing related to transmission of the first signal interpolated by the interpolating means when it is determined that a first condition is satisfied, and continues the processing even after the first condition is no longer satisfied during a period in which a second condition that differs from the first condition is satisfied.

The signal processing device can pick up and transmit the voice of the user U1 through the conduction of the cartilage of the ear canal. Also, the signal processing device transmits the first signal interpolated by the interpolation means. As a result, it is possible to reduce the sense of uneasiness with respect to the sounds picked up by the conduction of the cartilage of the ear canal.

Ninth Embodiment

The microphone device 1 according to the ninth embodiment will be described below.

The configuration of the microphone device 1 according to the ninth embodiment is the same as the configuration of the microphone device 1 according to the first embodiment.

A usage example of the microphone device 1 according to the ninth embodiment is the same as the usage example shown in FIG. 1.

(Configuration of Microphone Device)

The configuration of the microphone device 1 according to the ninth embodiment will be described below.

The first condition according to the ninth embodiment is that the value obtained by dividing the sound pressure level indicated by a first signal by the sound pressure level indicated by a second signal is equal to or greater than a preset second threshold. The sensitivity of the first microphone 11 and the sensitivity of the second microphone 12 may differ. In this case, the sound pressure level indicated by the first signal may not be higher than the sound pressure level indicated by the second signal even if the user U1 makes a vocal utterance. Also, depending on the environment in which the microphone device 1 is used and the type of the first microphone 11 or the second microphone 12, even if the user U1 utters a sound, the sound pressure level indicated by the first signal may not be greater than the sound pressure level indicated by the second signal. By adjusting the second threshold according to the above case, the microphone device 1 can extract and transmit the voice of the user U1 even in the above case.

(Operation of Microphone Device)

The operation of the microphone device 1 according to the ninth embodiment will be described below.

Figure 21:
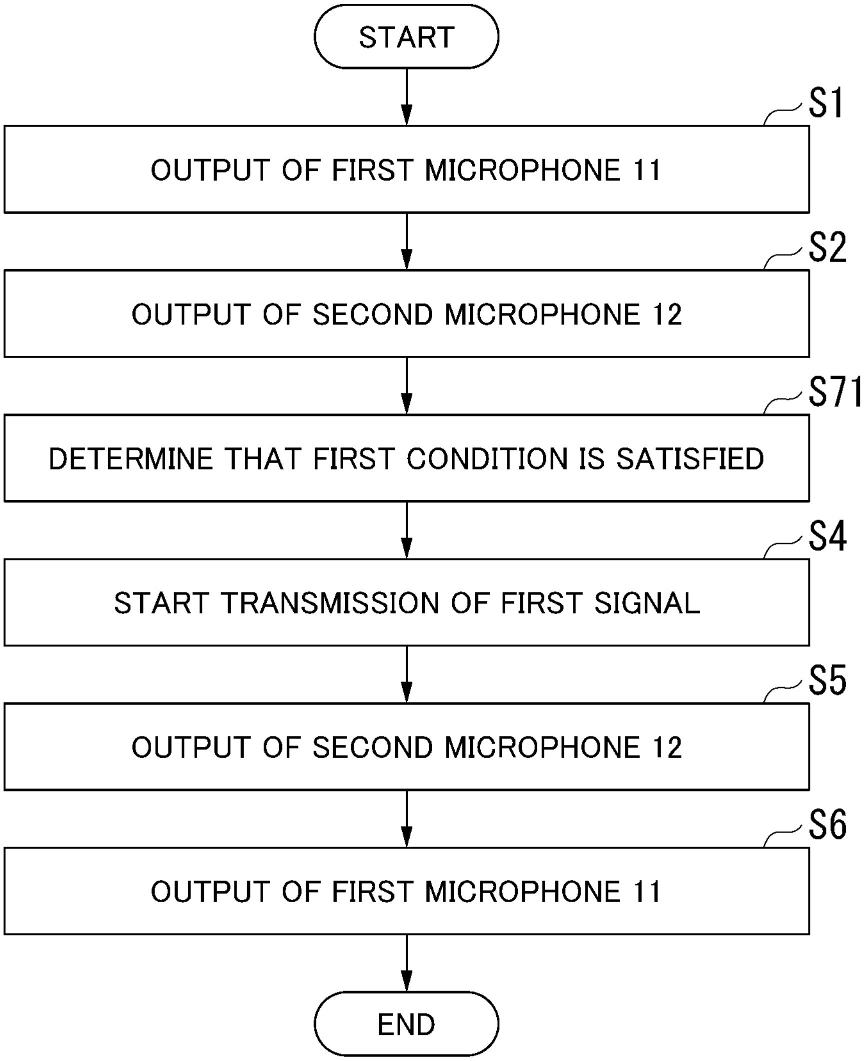
FIG. 21 A flowchart showing the operation of a microphone device according to the ninth embodiment.

FIG. 21 is a flowchart showing the operation of a microphone device 1 according to the ninth embodiment.

Steps S1 and S2 are the same as steps S1 and S2 in the operation of the microphone device 1 according to the first embodiment.

The determination unit 13 determines that the relationship between the first signal and the second signal satisfies the first condition (Step S71). Since the value obtained by dividing the sound pressure level indicated by IS1 by the sound pressure level indicated by OS1 is equal to or greater than the second threshold, the determination unit 13 determines that the first condition is satisfied.

Steps S4 to S6 are the same as steps S4 to S6 of the operation of the microphone device 1 according to the first embodiment.

Action and Effect

The first condition of the signal processing device according to the present disclosure is that the value obtained by dividing the sound pressure level indicated by the first signal by the sound pressure level indicated by the second signal is equal to or greater than a preset second threshold.

Even if the sensitivity of the first microphone 11 and the sensitivity of the second microphone 12 are different, the signal processing device can extract and transmit the voice of the user U1 by using the second threshold.

Tenth Embodiment

The microphone device 1 according to the tenth embodiment will be described below.

The configuration of the microphone device 1 according to the tenth embodiment is a configuration including a threshold setting unit 24, a threshold storage unit 25, and an input reception unit 26 in addition to the configuration of the microphone device 1 according to the first embodiment.

A usage example of the microphone device 1 according to the tenth embodiment is the same as the usage example shown in FIG. 1.

(Configuration of Microphone Device)

The configuration of the microphone device 1 according to the tenth embodiment will be described below.

Figure 22:
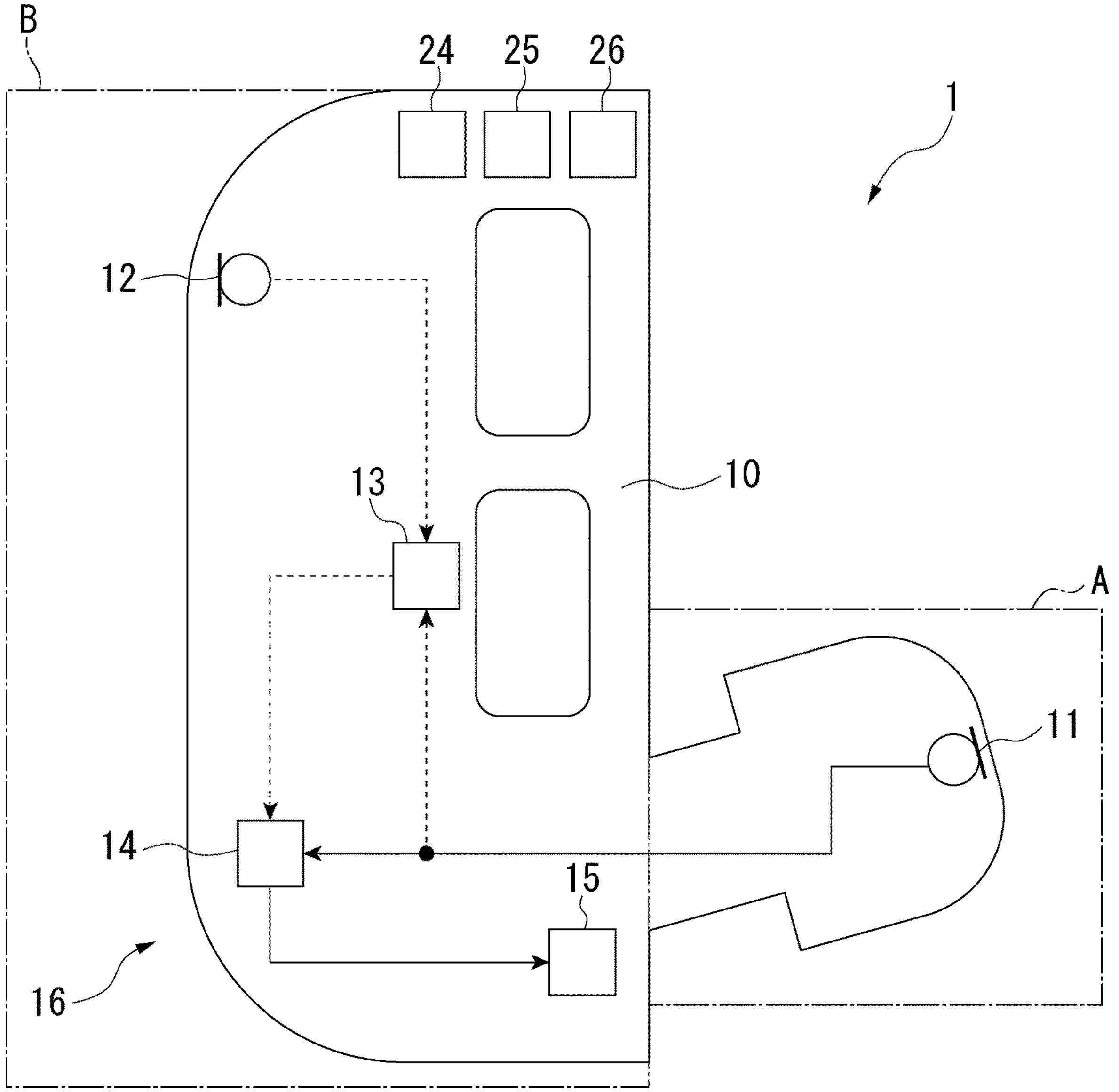
FIG. 22 A diagram showing the configuration of the microphone device according to the ninth embodiment.

FIG. 22 is a diagram showing the configuration of the microphone device 1 according to the tenth embodiment. The microphone device 1 includes the case 10, the first microphone 11, the second microphone 12, the determination unit 13, the detection unit 14, the signal transmission unit 15, the threshold setting unit 24, the threshold storage unit 25, and the input reception unit 26.

Note that the solid arrows shown in FIG. 22 indicate the flow of electrical signals pertaining to the signal transmission unit 15. The dotted arrows shown in FIG. 22 indicate the flow of electrical signals pertaining to the determination unit 13.

The threshold setting unit 24 records the second threshold in the threshold storage unit 25 based on the sound pressure level indicated by the first signal or the sound pressure level indicated by the second signal. The threshold setting unit 24 is an example of a threshold setting means. For example, when the input reception unit 26 has received an input indicating the test mode from the user U1, the threshold setting unit 24 starts operating. Subsequently, the user U1 wears the microphone device 1 and speaks. Thereby, the first signal and the second signal are output. The threshold setting unit 24 records the second threshold in the threshold storage unit 25 based on the sound pressure level indicated by the first signal or the sound pressure level indicated by the second signal that has been output. Also, in the test mode, the signal transmission unit 15 does not transmit the first signal to the smartphone 3.

The threshold storage unit 25 stores the second threshold. The threshold storage unit 25 is an example of a storage means.

The input reception unit 26 receives an input indicating the test mode and an input indicating the normal mode from the user U. When the input reception unit 26 has received an input indicating the normal mode from the user U1, the threshold setting unit 24 stops operating. That is, in the normal mode, the threshold setting unit 24 does not record the second threshold. Also, in the normal mode, the signal transmission unit 15 transmits the first signal to the smartphone 3.

The first condition is that the value obtained by dividing the sound pressure level indicated by the first signal by the sound pressure level indicated by the second signal is equal to or greater than the second threshold.

(Operation of Microphone Device)

The operation of the microphone device 1 according to the tenth embodiment will be described below.

Figure 23:
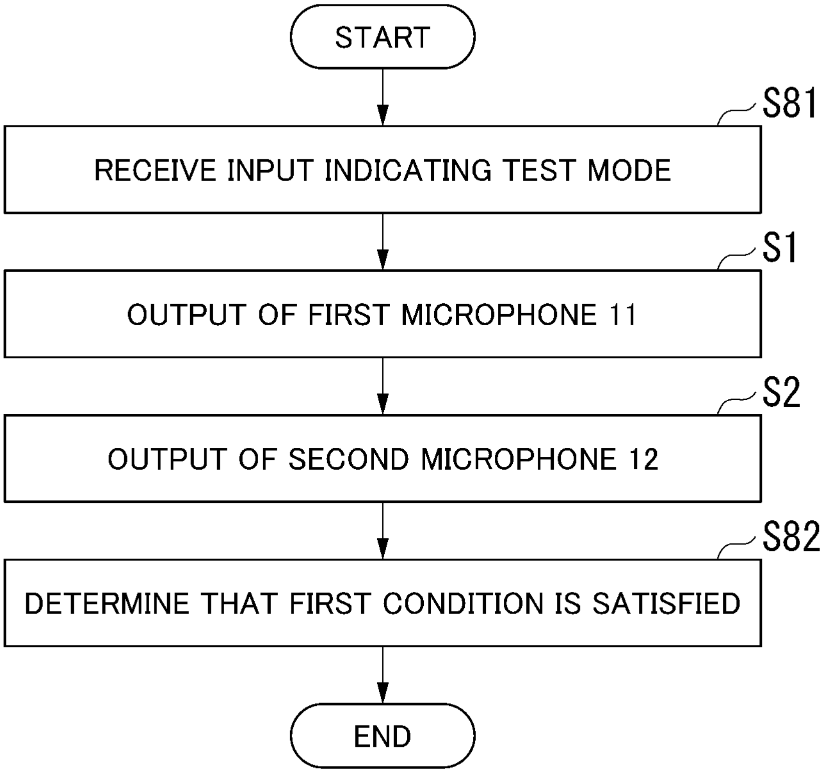
FIG. 23 A flowchart showing the operation of a microphone device according to the tenth embodiment.

FIG. 23 is a flowchart showing the operation of the microphone device 1 in the test mode.

The user U1 makes an input to the microphone device 1 indicating the test mode. The input reception unit 26 receives the input indicating the test mode (Step S81).

Steps S1 and S2 are the same as steps S1 and S2 in the operation of the microphone device 1 according to the first embodiment.

The threshold setting unit 24 records the second threshold in the threshold storage unit 25 based on the sound pressure level indicated by the first signal or the sound pressure level indicated by the second signal.

By the operation described above, the microphone device 1 can set the second threshold by the voice of the user U.

The operation of the microphone device 1 according to the normal mode is the same as the operation of the microphone device 1 in the ninth embodiment.

Action and Effect

A signal processing apparatus according to the embodiment of the present disclosure further includes a threshold setting means for recording the second threshold in the storage means based on the sound pressure level indicated by the first signal or the sound pressure level indicated by the second signal. The first condition is that the value obtained by dividing the sound pressure level indicated by the first signal by the sound pressure level indicated by the second signal is equal to or greater than the second threshold recorded in the storage means by the threshold setting means.

By the operation described above, the signal processing device can set the second threshold by the voice of the user U.

Eleventh Embodiment

The microphone device 1 according to the eleventh embodiment will be described below.

The configuration of the microphone device 1 according to the eleventh embodiment is a configuration including the speaker 19 and the authentication unit 20 in addition to the configuration of the microphone device 1 according to the tenth embodiment.

A usage example of the microphone device 1 according to the eleventh embodiment is the same as the usage example shown in FIG. 1.

(Configuration of Microphone Device)

The configuration of the microphone device 11 according to the eleventh embodiment will be described below.

Figure 24:
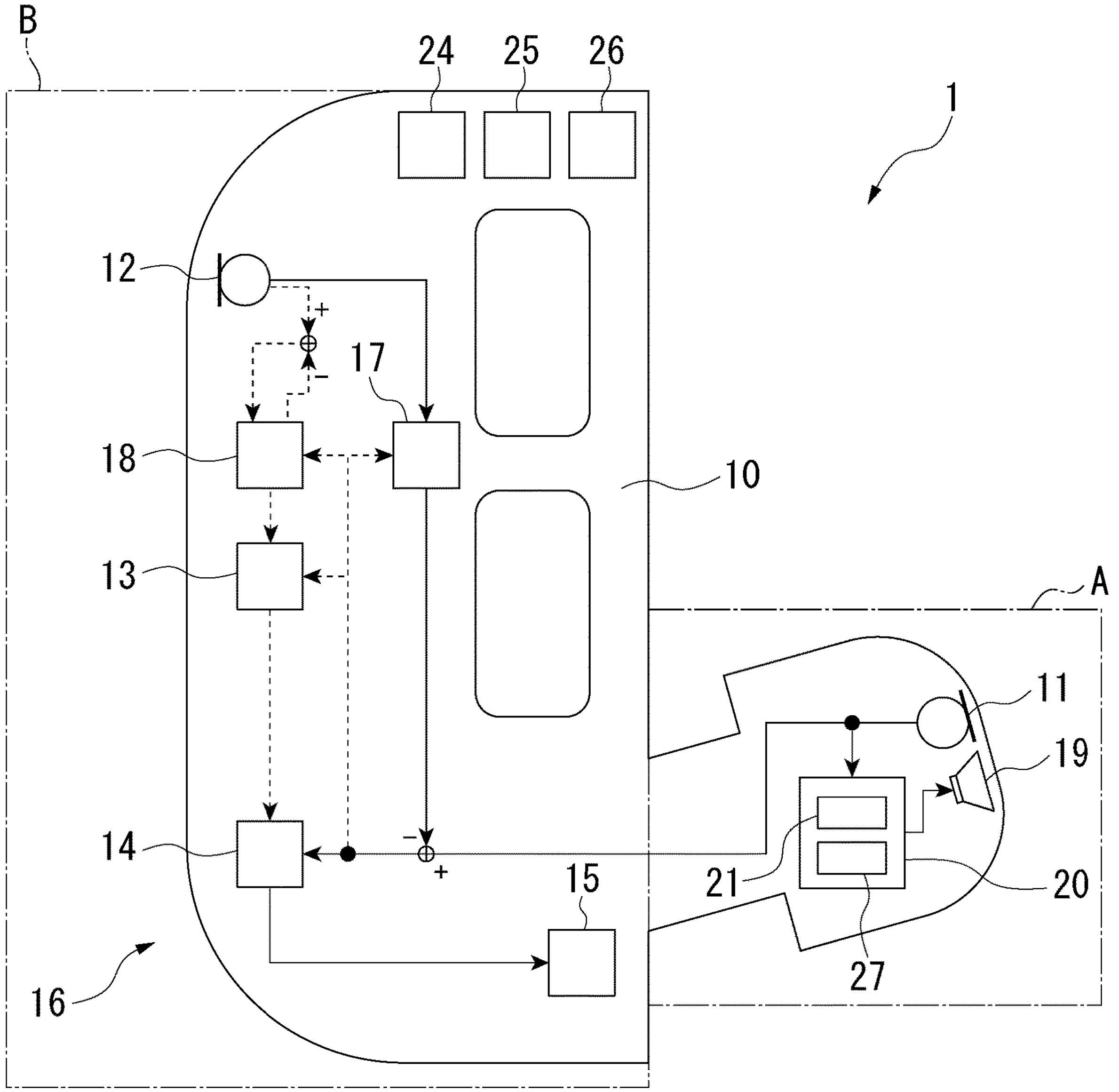
FIG. 24 A diagram showing the configuration of a microphone device according to the eleventh embodiment.

FIG. 24 is a diagram showing the configuration of the microphone device 1 according to the eleventh embodiment.

Note that the solid arrows shown in FIG. 24 indicate the flow of electrical signals pertaining to the signal transmission unit 15. The dotted arrows shown in FIG. 24 indicate the flow of electrical signals pertaining to the determination unit 13.

The speaker 19 and user identification unit 21 are the same as the speaker 19 and user identification unit 21 according to the sixth embodiment.

The threshold storage unit 25 associates and stores the user U and the second threshold.

The authentication unit 20 includes the user identification unit 21 and a threshold identification unit 27.

The threshold identification unit 27 collates the user U identified by the user identification unit 21 with the information stored in the threshold storage unit 25 to identify the second threshold. That is, the threshold identification unit 27 collates the user U with information in which the user U and the second threshold are associated to identify the second threshold. The threshold identification unit 27 is an example of a threshold identification means.

The first condition is that the value obtained by dividing the sound pressure level indicated by the first signal by the sound pressure level indicated by the second signal is equal to or greater than the second threshold identified by the threshold identification unit 27.

(Operation of Microphone Device)

The operation of the microphone device 1 according to the eleventh embodiment will be described below.

The operation of the microphone device 1 according to the test mode is the same as the operation of the microphone device 1 according to the test mode in the tenth embodiment.

Figure 25:
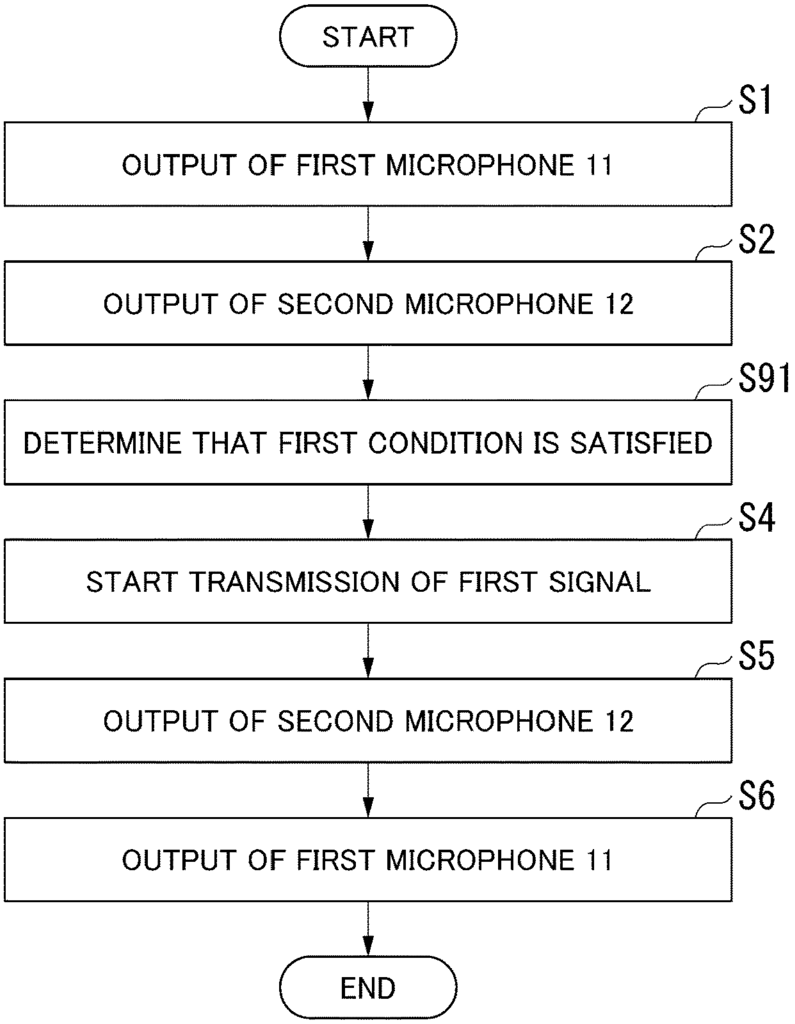
FIG. 25 A flowchart showing the operation of a microphone device according to one embodiment.

FIG. 25 is a flowchart showing the operation of the microphone device 1 according to the normal mode.

Steps S1 and S2 are the same as steps S1 and S2 in the operation of the microphone device 1 according to the first embodiment.

The determination unit 13 determines that the relationship between the first signal and the second signal satisfies the first condition (Step S91). Since the value obtained by dividing the sound pressure level indicated by IS1 by the sound pressure level indicated by OS1 is equal to or greater than the second threshold identified by the threshold identification unit 27, the determination unit 13 determines that the first condition is satisfied.

Steps S4 to S6 are the same as steps S4 to S6 of the operation of the microphone device 1 according to the first embodiment.

Action and Effect

The signal processing device according to the embodiment of the present disclosure further includes a speaker 19 that sends out sound to an ear canal of the user U, a user identification means that identifies the user U based on the sound sent out by the speaker 19, and a threshold identification means that identifies the second threshold associated with the user U identified by the user identification means, among the second thresholds recorded in the storage means. The first condition is that the value obtained by dividing the sound pressure level indicated by the first signal by the sound pressure level indicated by the second signal is equal to or greater than the second threshold identified by the threshold identification means.

The signal processing device can set the second threshold based on the user U's voice. In addition, the signal processing device identifies the second threshold associated with the user U based on the reverberation sound of the user U's ear canal, and extracts and transmits the user U's voice.

<Basic Configuration>

A microphone device according to the basic configuration will be described below.

Figure 26:
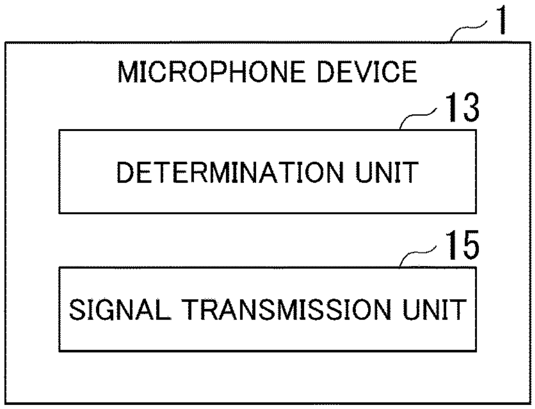
FIG. 26 A diagram showing the configuration of a signal processing device according to the basic configuration.

FIG. 26 is a diagram showing the configuration of the microphone device 1 according to the basic configuration. As shown in FIG. 26, the microphone device 1 according to the basic configuration includes the determination unit 13 and the signal transmission unit 15.

Action and Effect

The signal processing device according to the basic configuration includes a determination means that determines whether a first condition is satisfied by the relationship between a first signal, which is based on the output of the first microphone 11 inserted into an ear canal of a user U, and a second signal, which is based on the output of a second microphone 12 positioned outside the ear canal, and a signal transmission means that, if a determination was made that the first condition is satisfied, starts processing relating to the transmission of a sound signal, and that continues the processing, even after the first condition is no longer satisfied, during a period in which a second condition which differs from the first condition is satisfied.

The signal processing device starts and continues processing related to sound signal transmission based on the first condition and the second condition. Thereby, the signal processing device can improve versatility in extracting the voice of the user U.

<Computer Configuration>

Figure 27:
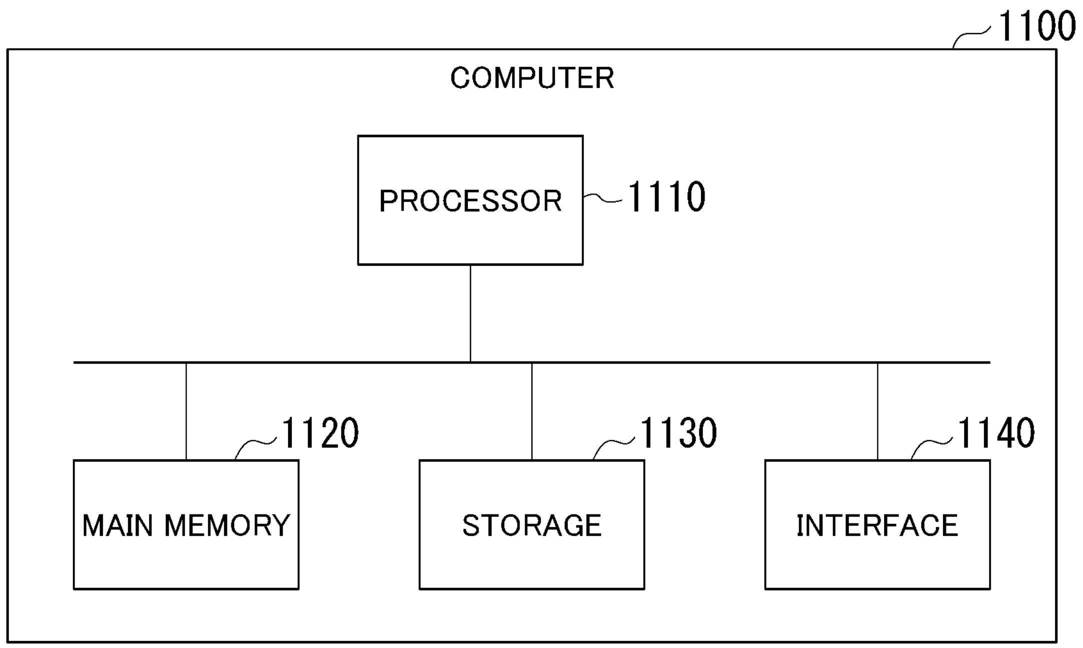
FIG. 27 A schematic block diagram showing the configuration of a computer according to at least one embodiment.

FIG. 27 is a schematic block diagram showing the configuration of a computer according to at least one embodiment.

A computer 1100 includes a processor 1110, a main memory 1120, a storage 1130 and an interface 1140.

The microphone device 1 and the external device 40 described above are implemented in the computer 1100. The operation of each processing unit described above is stored in the storage 1130 in the form of a program. The processor 1110 reads a program from the storage 1130, deploys the program to the main memory 1120, and executes the above processing according to the program. Further, the processor 1110 reserves storage areas corresponding to the storage units described above in the main memory 1120 according to the program.

The program may be for realizing some of the functions that the computer 1100 is caused to exhibit. For example, the program may function in combination with another program already stored in storage 1130 or in combination with another program installed in another device. In another embodiment, the computer 1100 may include a custom LSI (Large Scale Integrated Circuit) such as a PLD (Programmable Logic Device) in addition to or instead of the above configuration. Examples of PLDs include a PAL (Programmable Array Logic), a GAL (Generic Array Logic), a CPLD (Complex Programmable Logic Device), and a FPGA (Field Programmable Gate Array). In this case, part or all of the functions implemented by the processor 1110 may be implemented by the integrated circuit.

Examples of the storage 1130 include magnetic disks, magneto-optical disks, semiconductor memories, and the like. The storage 1130 may be an internal medium directly connected to the bus of the computer 1100, or an external medium connected to the computer via the interface 1140 or communication line. Moreover, when this program is distributed to the computer 1100 via a communication line, the computer 1100 receiving the distribution may deploy the program in the main memory 1120 and execute the above process. In at least one embodiment, the storage 1130 is a non-transitory, tangible storage medium.

Also, the program may be for realizing some of the functions described above. Furthermore, the program may be a so-called differential file (differential program) that implements the above-described functions in combination with another program already stored in the storage 1130.

Some or all of the above-described embodiments can also be described as in the following supplementary notes, but are not limited thereto.

(Supplementary Note 1) A signal processing device including: a determination means that determines whether a relationship between a first signal and a second signal satisfies a first condition, the first signal being based on an output of a first microphone inserted into an ear canal of a user, the second signal being based on an output of a second microphone positioned outside the ear canal; and a signal transmission means that starts processing relating to transmission of a sound signal when it is determined that the first condition is satisfied, and that continues the processing, even after the first condition is not satisfied, during a period in which a second condition that differs from the first condition is satisfied.

(Supplementary Note 2) The signal processing device according to supplementary note 1, wherein the first signal is output based on a sound picked up by the first microphone by conduction of vibrations through air, and the second signal is output based on a sound picked up by the second microphone by conduction of vibrations through air.

(Supplementary Note 3)

The signal processing device according to supplementary note 1 or 2, wherein the first condition is that a sound pressure level indicated by the first signal is higher than a sound pressure level indicated by the second signal.

(Supplementary Note 4) The signal processing device according to any one of supplementary notes 1 to 3, further including: a detection means that determines whether a sound pressure level indicated by the first signal is equal to or higher than a preset first threshold, wherein the second condition is that the sound pressure level indicated by the first signal is determined by the detection means to be equal to or higher than the first threshold, and the signal transmission means starts processing relating to transmission of the first signal when it is determined that the first condition is satisfied, and continues the processing, even after the first condition is not satisfied, during the period in which the second condition is satisfied.

(Supplementary Note 5) The signal processing device according to any one of supplementary notes 1 to 4, further including: a noise cancellation means that removes external noise from a signal output from the first microphone, wherein the first signal is a signal from which the external noise has been removed by the noise cancelation means.

(Supplementary Note 6) The signal processing device according to supplementary note 5, further including: a signal cancellation means that removes a predetermined sound from a signal output from the second microphone, wherein the second signal is a signal from which the predetermined sound has been removed by the signal cancellation means.

(Supplementary Note 7) The signal processing device according to supplementary note 6, wherein the noise cancellation means performs different processing depending on a feature quantity of the external noise, and the signal cancellation means performs different processing depending to the feature quantity of the predetermined sound, and removes the predetermined sound based on the first signal.

(Supplementary Note 8) The signal processing device according to supplementary note 7, further including: a recording means that records in a storage means a noise filter used when the noise cancellation means removes the external noise and a signal filter used when the signal cancellation means removes the predetermined sound, wherein the noise cancellation means removes the external noise based on the noise filter recorded in the storage means, and the signal cancellation means removes the predetermined sound based on the signal filter recorded in the storage means.

(Supplementary Note 9) The signal processing device according to supplementary note 7, wherein the noise cancellation means removes the external noise based on the noise filter recorded in an external device connected to the signal processing device, and the signal cancellation means removes the predetermined sound based on the signal filter recorded in the external device.

(Supplementary Note 10) The signal processing device according to supplementary note 8, further including: a speaker that sends out sound to an ear canal of the user: a user identification means that identifies the user based on the sound sent out by the speaker; and a filter identification means that identifies the noise filter or the signal filter associated with the user identified by the user identification means, among the noise filter or the signal filter recorded in the storage means, wherein the noise cancellation means removes the external noise based on the noise filter identified by the filter identification means, and the signal cancellation means removes the predetermined sound based on the signal filter identified by the filter identification means.

(Supplementary Note 11) The signal processing device according to supplementary note 9, further including: a speaker that sends out sound to an ear canal of the user, wherein the external device includes: a user identification means that identifies the user based on the sound sent out by the speaker; and a filter identification means that identifies the noise filter or the signal filter associated with the user identified by the user identification means, among the noise filter or the signal filter recorded in the external device, the noise cancellation means removes the external noise based on the noise filter identified by the external device, and the signal cancellation means removes the predetermined sound based on the signal filter identified by the external device.

(Supplementary Note 12) The signal processing device according to supplementary note 1, further including: an interpolation means that interpolates the first signal, wherein the first signal is output based on sound picked up by the first microphone by conduction from the cartilage of the ear canal, and the signal transmission means starts processing relating to transmission of the first signal interpolated by the interpolation means when it is determined that the first condition is satisfied, and continues the processing, even after the first condition is not satisfied, during a period in which the second condition is satisfied.

(Supplementary Note 13) The signal processing device according to supplementary note 1, wherein the first condition is that a value obtained by dividing a sound pressure level indicated by the first signal by a sound pressure level indicated by the second signal is equal to or higher than a preset second threshold.

(Supplementary Note 14) The signal processing device according to supplementary note 13, further including: a threshold setting means that records the second threshold in a storage means based on the sound pressure level indicated by the first signal or the sound pressure level indicated by the second signal, wherein the first condition is that the value obtained by dividing the sound pressure level indicated by the first signal by the sound pressure level indicated by the second signal is equal to or higher than the second threshold recorded in the storage means by the threshold setting means.

(Supplementary Note 15) The signal processing device according to supplementary note 14, further including: a speaker that sends out sound to the ear canal of the user: a user identification means that identifies the user based on the sound sent out by the speaker; and a threshold identification means that identifies the second threshold associated with the user identified by the user identification means, among the second threshold recorded in the storage means, wherein the first condition is that the value obtained by dividing the sound pressure level indicated by the first signal by the sound pressure level indicated by the second signal is equal to or higher than the second threshold identified by the threshold identification means.

(Supplementary Note 16) A microphone device including: a case that includes a first portion inserted into an ear canal of a user and a second portion located outside the ear canal and that is to be worn on an ear of the user and: a first microphone provided in the first portion of the case: a second microphone provided in the second portion of the case; and a control means that starts processing relating to transmission of a sound signal when a relationship between a first signal output from the first microphone and a second signal output from the second microphone satisfies a first condition, and continues the processing, even after the first condition is not satisfied, during a period in which a second condition that differs from the first condition is satisfied.

(Supplementary Note 17) A signal processing method including: determining whether a relationship between a first signal and a second signal satisfies a first condition, the first signal being based on an output of a first microphone inserted into an ear canal of a user, the second signal being based on an output of a second microphone positioned outside the ear canal; and starting processing relating to transmission of a sound signal when it is determined that the first condition is satisfied, and continuing the processing, even after the first condition is not satisfied, during a period in which a second condition that differs from the first condition is satisfied.

(Supplementary Note 18) A recording medium that stores a program causing a computer to execute: determining whether a relationship between a first signal and a second signal satisfies a first condition, the first signal being based on an output of a first microphone inserted into an ear canal of a user, the second signal being based on an output of a second microphone positioned outside the ear canal; and starting processing relating to transmission of a sound signal when it is determined that the first condition is satisfied, and continuing the processing, even after the first condition is not satisfied, during a period in which a second condition that differs from the first condition is satisfied.

This application is based upon and claims the benefit of priority from Japanese patent application No. 2020-186725 filed Nov. 9, 2020, the disclosure of which is incorporated herein in its entirety by reference.

INDUSTRIAL APPLICABILITY

The present disclosure relates to a signal processing device, a microphone device, a signal processing method, and a recording medium.

DESCRIPTION OF REFERENCE SIGNS

A First portion
B Second portion
U User
1 Microphone device
3 Smartphone
10 Case
11 First microphone
12 Second microphone
13 Determination unit
14 Detection unit
15 Signal transmission unit
16 Control unit
17 Noise cancellation unit
18 Signal cancellation unit
19 Speaker
20 Authentication unit
21 User identification unit
22 Filter identification unit
23 Interpolation unit
24 Threshold setting unit
25 Threshold storage unit
26 Input reception unit
27 Threshold setting unit
30 Filter storage device
31 Filter recording unit
32 Filter storage unit
40 External device
41 External storage unit
42 External user identification unit
43 External filter identification unit
1100 Computer
1110 Processor
1120 Main memory
1130 Storage
1140 Interface

The invention claimed is:

1. A signal processing device comprising:
a memory configured to store instructions; and
a processor configured to execute the instructions to:
determine whether a relationship between a first signal and a second signal satisfies a first condition, the first signal being based on an output of a first microphone inserted into an ear canal of a user, the second signal being based on an output of a second microphone positioned outside the ear canal; and
start processing relating to transmission of a sound signal when it is determined that the first condition is satisfied, and continue the processing, even after the first condition is not satisfied, during a period in which a second condition that differs from the first condition is satisfied.

2. The signal processing device according to claim 1, wherein the first signal is output based on a sound picked up by the first microphone by conduction of vibrations through air, and the second signal is output based on a sound picked up by the second microphone by conduction of vibrations through air.

3. The signal processing device according to claim 1, wherein the first condition is that a sound pressure level indicated by the first signal is higher than a sound pressure level indicated by the second signal.

4. The signal processing device according to claim 1, wherein the processor is configured to execute the instructions to determine whether a sound pressure level indicated by the first signal is equal to or higher than a preset first threshold, and the second condition is that the sound pressure level indicated by the first signal is determined to be equal to or higher than the first threshold, and the processor is configured to execute the instructions to start processing relating to transmission of the first signal when it is determined that the first condition is satisfied, and continue the processing, even after the first condition is not satisfied, during the period in which the second condition is satisfied.

5. The signal processing device according to claim 1, wherein the processor is configured to execute the instructions to remove external noise from a signal output from the first microphone, and the first signal is a signal from which the external noise has been removed.

6. The signal processing device according to claim 5, wherein the processor is configured to execute the instructions to remove a predetermined sound from a signal output from the second microphone, and the second signal is a signal from which the predetermined sound has been removed.

7. The signal processing device according to claim 6, wherein the processor is configured to execute the instructions to perform different processing depending on a feature quantity of the external noise, and the processor is configured to execute the instructions to perform different processing depending to the feature quantity of the predetermined sound, and remove the predetermined sound based on the first signal.

8. The signal processing device according to claim 7, wherein the processor is configured to execute the instructions to record in a storage a noise filter used when the external noise is removed and a signal filter used when the predetermined sound is removed, the processor is configured to execute the instructions to remove the external noise based on the noise filter recorded in the storage, and the processor is configured to execute the instructions to remove the predetermined sound based on the signal filter recorded in the storage.

9. The signal processing device according to claim 7, wherein the processor is configured to execute the instructions to remove the external noise based on the noise filter recorded in an external device connected to the signal processing device, and the processor is configured to execute the instructions to remove the predetermined sound based on the signal filter recorded in the external device.

10. The signal processing device according to claim 8, further comprising:

a speaker that sends out sound to an ear canal of the user;

wherein the processor is configured to execute the instructions to identify the user based on the sound sent out by the speaker the processor is configured to execute the instructions to identify the noise filter or the signal filter associated with the identified user, among the noise filter or the signal filter recorded in the storage, the processor is configured to execute the instructions to remove the external noise based on the identified noise filter, and the processor is configured to execute the instructions to remove the predetermined sound based on the identified signal filter.

11. The signal processing device according to claim 9, further comprising:

a speaker that sends out sound to an ear canal of the user, wherein the external device comprises:

a memory configured to store instructions; and a processor configured to execute the instructions stored in the memory of the external device to:

identify the user based on the sound sent out by the speaker; and identify the noise filter or the signal filter associated with the identified user, among the noise filter or the signal filter recorded in the external device, remove the external noise based on the noise filter identified by the external device, and the processor of the signal processing device is configured to execute the instructions stored in the memory of the signal processing device to remove the predetermined sound based on the signal filter identified by the external device.

12. The signal processing device according to claim 1, wherein the processor is configured to execute the instructions to interpolate the first signal, the first signal is output based on sound picked up by the first microphone by conduction from the cartilage of the ear canal, and the processor is configured to execute the instructions to start processing relating to transmission of the interpolated first signal when it is determined that the first condition is satisfied, and continue the processing, even after the first condition is not satisfied, during a period in which the second condition is satisfied.

13. The signal processing device according to claim 1, wherein the first condition is that a value obtained by dividing a sound pressure level indicated by the first signal by a sound pressure level indicated by the second signal is equal to or higher than a preset second threshold.

14. The signal processing device according to claim 13, wherein the processor is configured to execute the instructions to record the second threshold in a storage based on the sound pressure level indicated by the first signal or the sound pressure level indicated by the second signal, and the first condition is that the value obtained by dividing the sound pressure level indicated by the first signal by the sound pressure level indicated by the second signal is equal to or higher than the second threshold recorded in the storage.

15. The signal processing device according to claim 14, further comprising:

a speaker that sends out sound to the ear canal of the user, wherein the processor is configured to execute the instructions to identify the user based on the sound sent out by the speaker, the processor is configured to execute the instructions to identify the second threshold associated with the identified user, among the second threshold recorded in the storage, the first condition is that the value obtained by dividing the sound pressure level indicated by the first signal by the sound pressure level indicated by the second signal is equal to or higher than the identified second threshold.

16. A microphone device comprising:

a case that includes a first portion inserted into an ear canal of a user and a second portion located outside the ear canal and that is to be worn on an ear of the user and;

a first microphone provided in the first portion of the case;

a second microphone provided in the second portion of the case; and a memory configured to store instructions; and a processor configured to execute the instructions to start processing relating to transmission of a sound signal when a relationship between a first signal output from the first microphone and a second signal output from the second microphone satisfies a first condition, and continue the processing, even after the first condition is not satisfied, during a period in which a second condition that differs from the first condition is satisfied.

17. A signal processing method comprising:

determining whether a relationship between a first signal and a second signal satisfies a first condition, the first signal being based on an output of a first microphone inserted into an ear canal of a user, the second signal being based on an output of a second microphone positioned outside the ear canal; and starting processing relating to transmission of a sound signal when it is determined that the first condition is satisfied, and continuing the processing, even after the first condition is not satisfied, during a period in which a second condition that differs from the first condition is satisfied.

* * * * *